(12) United States Patent
Yim

(10) Patent No.: US 7,706,235 B2
(45) Date of Patent: Apr. 27, 2010

(54) OPTICAL PICKUP DEVICE

(75) Inventor: Boo Bin Yim, Suwon-si (KR)

(73) Assignee: LG Electronics Inc., Seoul (KR)

( * ) Notice: Subject to any disclaimer, the term of this patent is extended or adjusted under 35 U.S.C. 154(b) by 384 days.

(21) Appl. No.: 11/819,071

(22) Filed: Jun. 25, 2007

(65) Prior Publication Data

US 2008/0130431 A1 Jun. 5, 2008

(30) Foreign Application Priority Data

Jun. 26, 2006 (KR) .................. 10-2006-0057235
Jul. 3, 2006 (KR) .................. 10-2006-0061956
Aug. 22, 2006 (KR) .................. 10-2006-0079192

(51) Int. Cl.
*G11B 7/135* (2006.01)

(52) U.S. Cl. .................. 369/112.03; 369/44.23

(58) Field of Classification Search .................. None
See application file for complete search history.

(56) References Cited

U.S. PATENT DOCUMENTS 7,126,888 B2* 10/2006 Kobayashi ............... 369/44.23
2005/0161579 A1* 7/2005 Kim et al. ................. 250/201.5
2005/0195706 A1* 9/2005 Hwang .................... 369/44.23

* cited by examiner

*Primary Examiner*—Joseph H Feild
*Assistant Examiner*—Tawfik Goma
(74) *Attorney, Agent, or Firm*—Harness, Dickey & Pierce

(57) ABSTRACT

Disclosed herein is an optical pickup device. In an embodiment of the present invention, sub beams from which an AC component has been removed are generated using a first diffractive element based upon properties that a beam incident on a disc is reflected with being separated by the track structure of the disc, and beams reflected from adjacent layers are prevented from being diffracted to sub cells for receiving the sub beams using a second diffractive element. In this case, the grating direction of the first diffractive element and the second diffractive element is adjusted, and thus the influence of dead zones generated in a tracking error signal due to the second diffractive element is removed.

30 Claims, 25 Drawing Sheets

Single layer disc

Dual layer disc

FIG. 7A
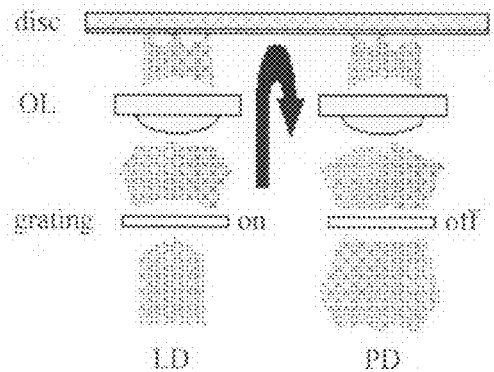
Normal (3 beam) DPP method
FIG. 7B
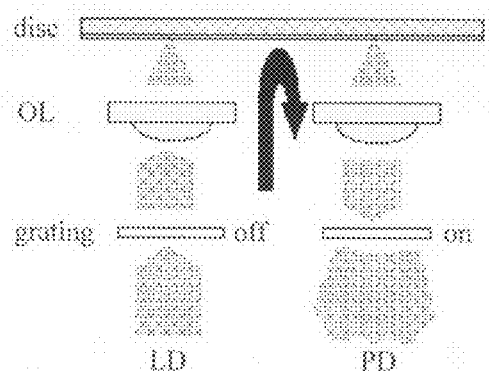
1 beam DPP method
FIG. 7C
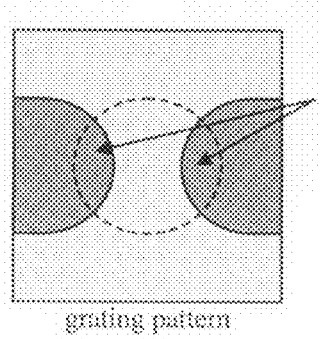 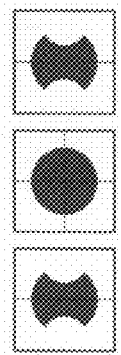
Grating and PD beam pattern of 1 beam DPP
* SPPs do not include area making AC signal

P1   P2   P3

FIG. 12
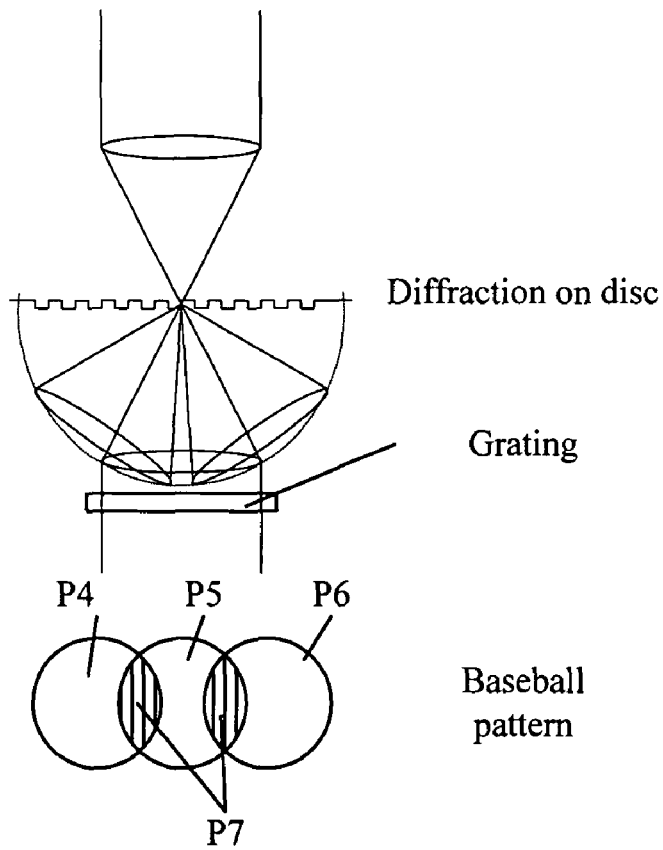
Diffraction on disc
Grating
P4   P5   P6
Baseball pattern
P7
Grating pattern
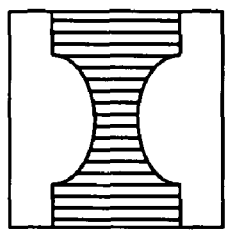 Non-used region (Phase management region)
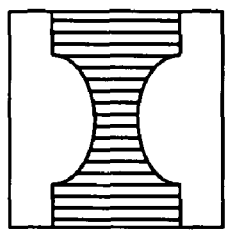 Used region
Track direction
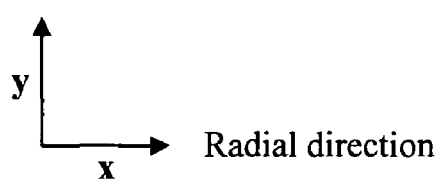
Radial direction Grating pattern Beam shape on PD

FIG. 17A
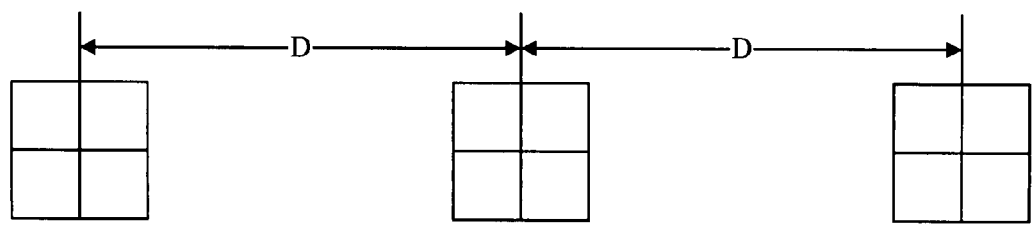
FIG. 17B
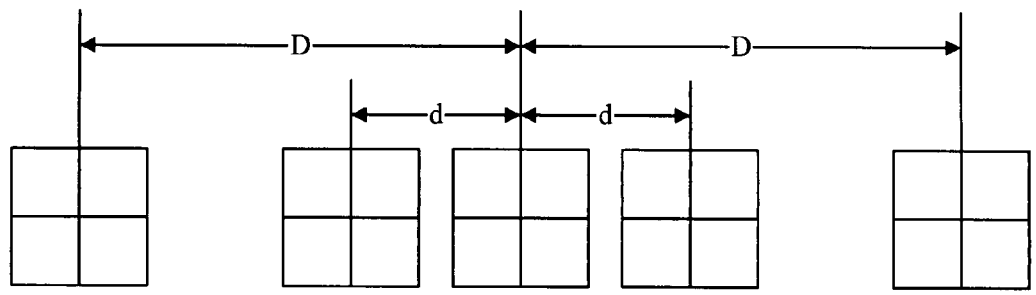
FIG. 18A       FIG. 18B       FIG. 18C
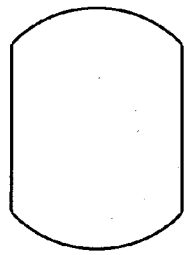            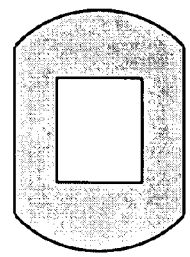

Grating pattern

Beam shape on PD

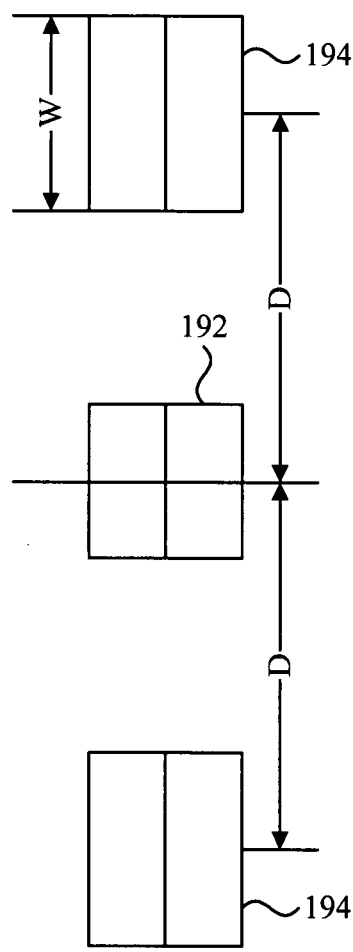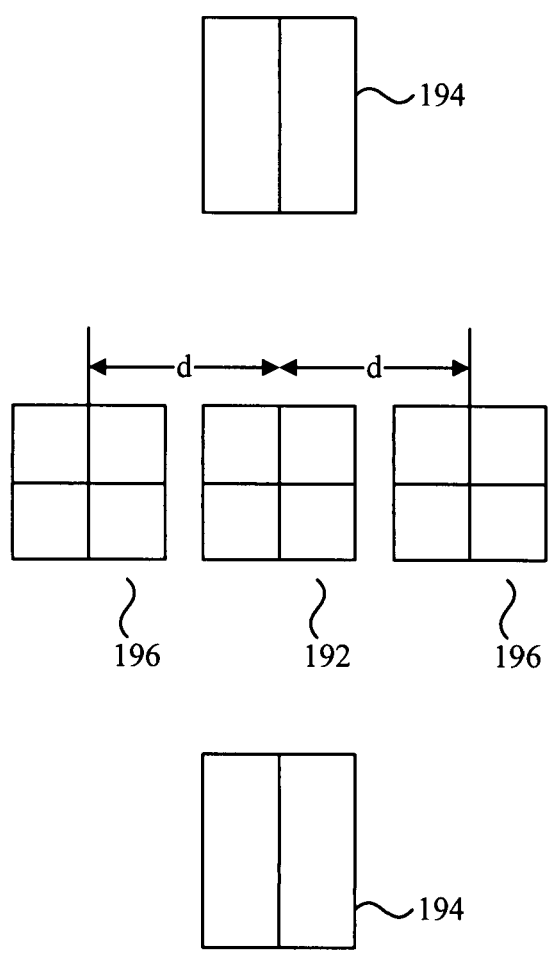

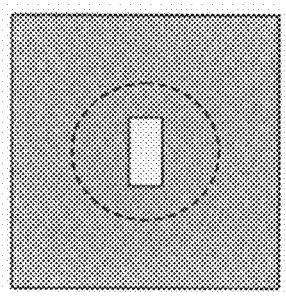
FIG. 23A
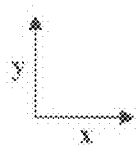
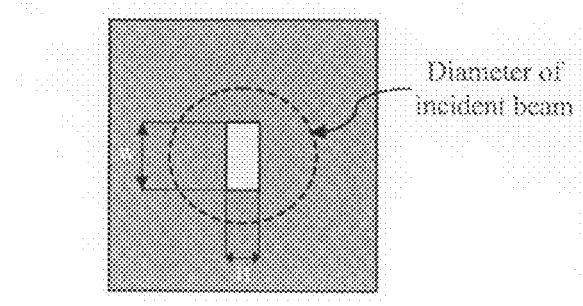
Diameter of incident beam
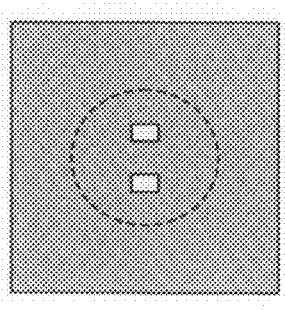
FIG. 23B
 DOE region
 Phase management region
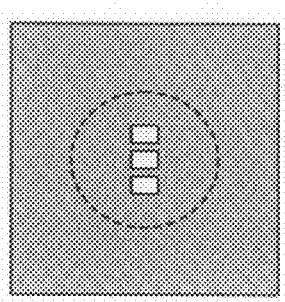
FIG. 23C (DOE element)

(DOE locations)

(Beam distribution on PD)

FIG. 27A      FIG. 27B
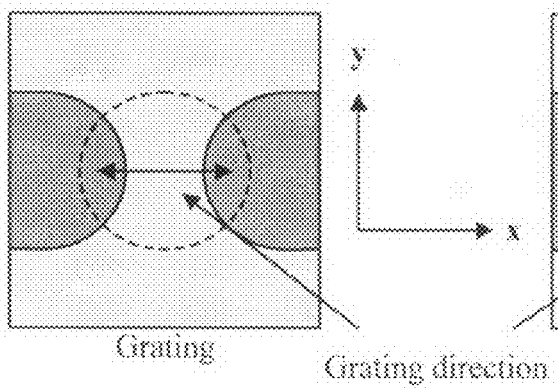
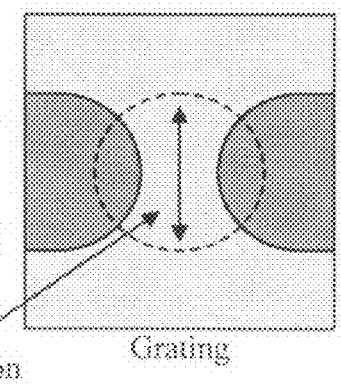
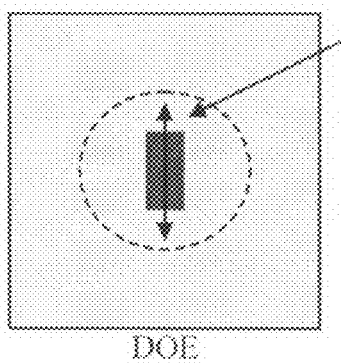
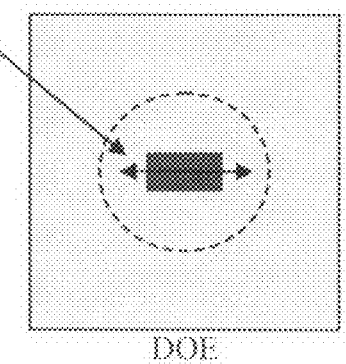
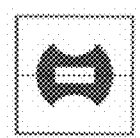
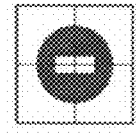
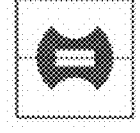
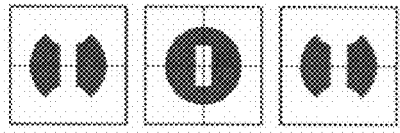
PD beam shape ↕ Movement direction of sub beam ↔ Movement direction of sub beam Grating + DOE Grating + DOE Grating + DOE

FIG. 30A
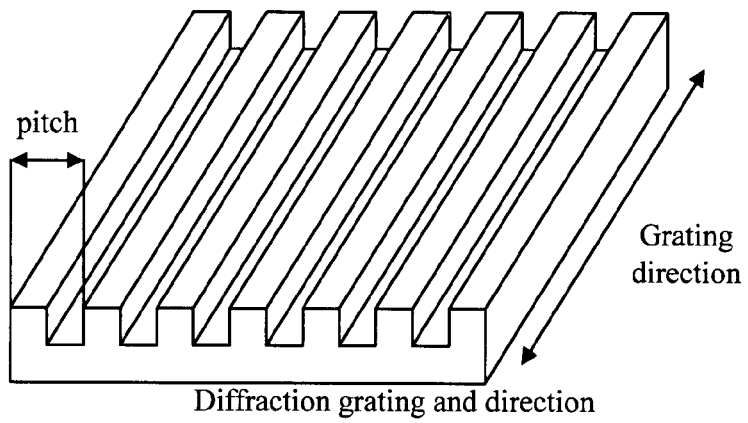
Diffraction grating and direction
FIG. 30B
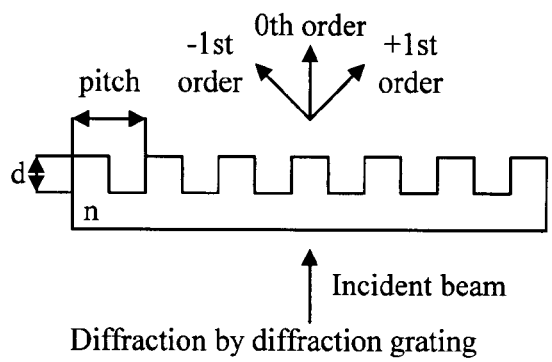
Diffraction by diffraction grating
FIG. 30C
 one mask, 2 phase levels
 two masks, 4 phase levels
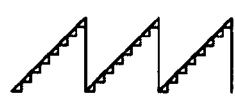 three masks, 8 phase levels
Blazed type HOE and implementation method thereof

OPTICAL PICKUP DEVICE

PRIORITY STATEMENT

This application claims the priority of Korean Patent Application Nos. 10-2006-0057235, filed on Jun. 26, 2006, Korean Patent No 10-2006-0061956 filed on Jul. 3, 2006 and Korean Patent No 10-2006-0079192 filed Aug. 22, 2006 in the Korean Intellectual Property Office, the disclosure of which is incorporated herein in its entirety by reference.

BACKGROUND OF THE INVENTION

1. Field of the Invention

The present invention relates, in general, to an optical pickup device and, more particularly, to an optical pickup device, which can prevent noise, generated from other layers, from flowing into servo signals.

2. Description of the Related Art

Ever since a Compact Disc (CD), which is an optical storage medium capable of storing up to 74 minutes of audio (music) or 650 Mbytes of data has been marketed, a Digital Versatile Disc (DVD) capable of holding two hours of Standard Definition (SD)-level video has been widely commercialized. Further, a Blu-ray Disc (BD) or a High-Definition (HD) DVD, capable of storing HD-level movie, will be introduced to the market in the near future.

Optical storage media, such as a CD, a DVD, and a BD, are disc-type media in which data is stored using optical characteristics, and data is recorded on an optical disc or the data recorded on the disc is reproduced through an optical pickup device. Optical storage media include discs for reproduction, on which data was previously recorded, and discs for recording which enable writing or rewriting, such as a CD-Recordable/Rewritable(R/RW), DVD-R/+R/-RW/+RW/Random Access Memory (RAM), a BD-Recordable/Recordable-Rewritable (-R/-RE).

An optical pickup records data on a disc or reads data from the optical disc in a state in which a laser beam is accurately focused on the track of the disc, which is rotating at high speed.

In order to obtain servo signals, such as a focusing error signal and a tracking error signal, corresponding to the position error of a beam spot focused on a disc, and to correct the position error of the beam spot on the basis of the servo signals, that is, in order to perform a servo operation, an optical pickup is implemented such that optical parts, such as an objective lens and a beam splitter, mechanical parts, such as an actuator and a base, and electrical parts, such as a laser diode and a photodetector, are arranged therein.

An astigmatic method is generally used for the detection of a focusing error signal, regardless of the type of disc and discs for recording/reproduction. In relation to the detection of a tracking error signal, a 3-beam method or a Differential Phase Detection (DPD) method is used in a disc for reproduction, and a Differential Push-Pull (DPP) method is representatively used in a disc for recording.

FIG. 1 illustrates the principles of the detection of a tracking error signal based on a DPP method.

The DPP method is a method which improves on a conventional 1-beam push-pull method and which can cancel offset occurring due to the movement of an objective lens in a radial direction or due to the tilt of a disc, and can detect a stable tracking error signal.

In the DPP method, a laser beam emitted from a light source is separated into three beams, that is, a 0th order diffracted beam and +/−1st order diffracted beams through a diffractive element called a grating. The grating is controlled such that, when a main beam, the 0th order diffracted beam, is arranged in the groove of a disc track, sub-beams, the +/−1st order diffracted beams, are arranged in lands adjacent to the groove in which the main beam is arranged (that is, such that the sub-beams are arranged to be spaced apart from the main beam by a distance of a ½ track pitch). Further, a tracking error signal is detected on the basis of differential signals of left and right signals of respective beams in a radial direction.

The main beam, reflected from the disc, is received by a 4-divided (a, b, c, d) main photodetector, and is detected as a Main Push-Pull (MPP)((A+D)−(B+C)) signal, which is a push-pull signal. Respective sub beams reflected from the disc are received by 2-divided (E1, E2) (F1, F2) sub photodetectors, and are detected as a Sub Push-Pull (SPP) ((E1−E2)+(F1−F2)) signal. When the sub beams are arranged to be spaced apart from the main beam by a distance of ½ track pitch, the phases of the MPP and SPP become opposite each other, as shown in FIG. 2.

Since offset occurs in the same direction both for MPP and SPP, according to the tilt or movement of an objective lens in a radial direction, an offset-free push-pull signal can be obtained if operation is performed using DPP=MPP−k×SPP (where k is a proportional constant). Further, a push-pull signal having greater amplitude can be obtained by subtracting the SPP having an opposite phase from the MPP.

Generally, the ratio of quantities of light of a main beam, used to generate an MPP signal, and sub beams, used to generate an SPP signal in the DPP method, is set to about 1:5:1 to 1:20:1, so that the light quantity of the sub beams is set to be equal to about ⅕ to 1/20 of that of the main beam. In the equation for obtaining the DPP signal, the proportional constant k is adjusted (for example, k is adjusted to 5 when the ratio of light quantities is 1:10:1), thus canceling the offset.

As described above, in order to use the DPP method, the angle of the sub beams, which are +/−1st order diffracted beams, must be adjusted while a grating is rotated. In this case, there is a disadvantage in that signal characteristics may be influenced by the extent of adjustment.

That is, when the main beam is positioned in a groove (or land), the sub beams must be positioned in the lands (or grooves). However, track pitches may differ from each other for respective disc types. For example, in the case of a DVD+RW or DVD-RW, the track pitch (Tp), indicating the distance between tracks, is 0.74 μm, and in the case of DVD-RAM, the track pitch is 0.615 μm, so that it is difficult to apply the same angle to discs having different track pitches.

Further, with the development of a BD or HD-DVD, the necessity for an optical disc recording/reproducing device capable of reproducing or recording all types of CD, DVD, and BD (or HD-DVD) has increased. However, since the numerical apertures of objective lenses required for the recording/reproduction of CD, DVD, and BD differ greatly from each other, it is almost impossible to reproduce all three types of discs using only a single objective lens.

In consideration of this necessity, an optical pickup, in which two objective lenses, that is, an objective lens for CD/DVD and an objective lens for BD or HD-DVD, are mounted on an actuator, has recently been developed. The two objective lenses can be arranged in the direction of the track (tangential direction) of a disc, or the inner/outer circumferential direction (radial direction) of the disc. When the objective lenses are arranged in the radial direction, it is not easy to access the innermost circumference of the disc, and thus an optical pickup in which two objective lenses are arranged in the track direction has been developed.

FIG. 3 illustrates an example in which one objective lens deviates from the central axis of a disc and is arranged off-axis when two objective lenses, mounted on a single actuator, are arranged in the track direction.

As shown in FIG. 3, when two objective lenses are arranged in the track direction, at least one of the two objective lenses deviates from the axis for connecting the inner and outer circumferences of a disc (axis passing through the center of the disc). In an optical system using the objective lens disposed at the location deviating from the central axis of the disc, since the relative positions of a main beam and sub beams required for DPP detection on the track (angle of the sub beams) vary as the optical pickup moves from the inner circumference of the disc to the outer circumference, the adjustment of the angle of the sub beams is meaningless.

Meanwhile, a multi-layer structure, in which two or more recording layers are formed to increase storage capacity, is being adopted in standards for DVD and BD. Further, it is expected that, even in the case of a high density disc, which will be developed in the future, a multi-layer structure will be generalized.

In order to increase the density of a disc, the wavelength of a laser beam is shortened, and the Numerical Aperture (NA) of an objective lens is gradually increased. In the case of a CD, a laser diode having a wavelength of 780 nm and an objective lens having an NA=0.45 are used. In the case of a DVD, a laser diode having a wavelength of 650 nm and an objective lens having an NA=0.6 are used. In the case of a BD, a laser diode having a wavelength of 405 nm and an objective lens having an NA=0.85 are used.

In a multi-layer disc, the interval between recording layers is determined to be approximately proportional to the focal depth of a beam spot. Since the focal depth is proportional to the wavelength of a laser beam and is inversely proportional to the square of the NA of an objective lens, the interval between recording layers must decrease as recording density increases.

When a recording or reproduction operation is performed on a multi-layer disc having a short interval between layers, a beam reflected from a layer adjacent to a current recording layer, that is, noise light from another layer, easily flows into photodetectors, as shown in FIG. 4.

Noise light from another layer also flows into a main photodetector for receiving a main beam and sub photodetectors for receiving sub beams, and thus influences servo signals as well as reproduced signals. In particular, the servo signals obtained using sub beams having a relatively small quantity of light are greatly influenced.

As shown in FIGS. 5A and 5B, there occurs a problem in that an SPP signal is excessively distorted due to noise light from another layer, and a DPP signal calculated based on the SPP signal, that is, a tracking error signal, is degraded. That is, when a disc having two or more recording layers is reproduced or recorded, noise occurs in reproduced signals and servo signals due to the beam reflected from another layer, as shown in FIGS. 4 and 5, and thus reproduction or recording performance may be deteriorated by this noise, and recording may occasionally be impossible.

SUMMARY OF THE INVENTION

Accordingly, the present invention has been made keeping in mind the above problems occurring in the prior art, and an object of the present invention is to provide an optical pickup device, which reduces interlayer interference in a multi-layer disc, thus obtaining stable servo signals and improving reproduction or recording performance.

Another object of the present invention is to provide a means of effectively coping with variation in the positions of sub beams occurring due to interlayer movement, the correction of spherical aberrations, variation in the pitch of a diffractive element, or variation in the focal distance (magnification) of a lens.

In accordance with an aspect of the present invention to accomplish the above objects, there is provided an optical pickup device, comprising a light source for emitting a beam having a predetermined wavelength; an objective lens for focusing the beam emitted from the light source on an optical storage medium; a beam splitter for passing or reflecting the beam emitted from the light source or beams reflected from the optical storage medium; a first diffractive element for generating a second beam having no component corresponding to a position of a beam, focused on the optical storage medium, on a track of the optical storage medium, from the beams reflected from the optical storage medium; a second diffractive element; a sensor lens for generating an astigmatism in the beams reflected from the optical storage medium; and photodetecting means including main detection means for receiving a first beam passing through the first and second diffractive elements without change, and two first sub detection means for receiving the second beam, wherein the second diffractive element diffracts part of beams reflected from other layers, rather than a current layer of the optical storage medium on which recording or reproduction is currently performed, thus preventing the diffracted beams from being incident on the photodetecting means.

In an embodiment of the present invention, the first diffractive element comprises a first region for diffracting part of an incident beam and generating the second beam, and the first region does not include a region in which a beam diffracted by the optical storage medium and a beam not diffracted by the optical storage medium, among the beams reflected from the optical storage medium while being diffracted and separated by the optical storage medium, overlap each other when passing through the first diffractive element.

In the embodiment, the first region may be formed in a rectangular shape which has a region, in which the beam diffracted by the optical storage medium among the beams reflected from the optical storage medium passes through the first diffractive element, as a boundary, or may comprise a region placed above a line for connecting two upper points and a region placed below a line for connecting two lower points, of four points at which the beam diffracted by the optical storage medium and the beam not diffracted by the optical storage medium, among the beams reflected from the optical storage medium, intersect when passing through the first diffractive element.

The first region may include a grating formed such that part of the incident beam is diffracted in a direction perpendicular to a direction in which the beams are diffracted by the optical storage medium, or may include a grating formed such that part of the incident beam is diffracted in a direction in which the beams are diffracted by the optical storage medium.

In an embodiment of the present invention, the second diffractive element comprises a third region for diffracting part of an incident beam, and the third region corresponds to a region in which a beam to be focused on the photodetecting means, among the beams reflected from said other layers, passes through the second diffractive element.

In the embodiment, the first region may include a grating formed such that part of the incident beam is diffracted in a direction parallel or perpendicular to a direction in which the beams are diffracted by the optical storage medium. The first region and the third region may have grating directions forming a right angle.

The third region may correspond to a region in which beams to be focused on the first sub detection means, among the beams reflected from said other layers, pass through the second diffractive element.

In an embodiment of the present invention, each of the first sub detection means may be disposed out of an effective radius of the beam passing through the first diffractive element and the second diffractive element without change, among the beams reflected from said other layers. In this case, the third region corresponds to a region in which beams to be focused on the first sub detection means, among the beams reflected from said other layers, pass through the second diffractive element.

In the embodiment, the first region may include a grating formed such that part of the incident beam is diffracted in a direction parallel or perpendicular to a direction in which the beams are diffracted by the optical storage medium, and wherein the first region and the third region may have grating directions forming a right angle.

Each of the first sub detection means may have a width greater than that of the main detection means. Each of the first sub detection means may be disposed at a location deviating from the main detection means according to a focal direction and a focal distance of the sensor lens, or may be divided by a boundary surface formed at an angle, which is defined by a line for connecting the first sub detection means and the main detection means, so as to obtain push-pull signals.

the optical pickup device may further comprise a grating for diffracting the beam emitted from the light source into a 0th order beam and +/−1st order beams and focusing the diffracted beams on the optical storage medium, and wherein the photodetecting means further comprises two second sub detection means for receiving the +/−1st order beams reflected from the optical storage medium. The first sub detection means and the main detection means may have a distance therebetween that is five times or more a distance between the second sub detection means and the main detection means.

In the embodiments, the first diffractive element and the second diffractive element may be integrated into a single device.

In the embodiments, the first diffractive element may be interposed between the beam splitter and the objective lens, between the beam splitter and the sensor lens, or between the sensor lens and the photodetecting means. Further, the optical pickup device may further comprise a quarter wave plate for rotating polarization of beams between the first diffractive element and the objective lens when the first diffractive element is interposed between the beam splitter and the objective lens.

In the embodiments, the second diffractive element may be interposed between the beam splitter and the objective lens, between the beam splitter and the sensor lens, or between the sensor lens and the photodetecting means. The first or second diffractive element diffracts only the beams reflected from the optical storage medium and does not diffract the beam emitted from the light source when the first or second diffractive element is interposed between the beam splitter and the objective lens. For this operation, the first or second diffractive element may be manufactured using liquid crystals.

In an embodiment of the present invention, a tracking error signal may be detected by Mpp−k(Spp1+Spp2) and k may be calculated based on variation in an offset of the Mpp and variation in offsets of Spp1 and Spp2 caused by a radial shift of the objective lens.

BRIEF DESCRIPTION OF THE DRAWINGS

The above and other objects, features and other advantages of the present invention will be more clearly understood from the following detailed description taken in conjunction with the accompanying drawings, in which:

FIGS. 7A to 7C are diagrams briefly showing the comparison of a 3 beam DPP method with a 1 beam DPP method;

FIG. 12 schematically illustrates the principles that AC component-removed sub beams are obtained from the beams reflected from and separated by a disc;

FIGS. 17A and 17B illustrate the arrangement of a cell for a main beam and cells for sub beams in a light receiving element according to the embodiment of FIG. 16;

FIGS. 18A to 18C are diagrams showing examples in which the shapes of the sub beam of a current layer and the sub beam of another layer, among the beams diffracted by the diffraction grating of FIG. 16A, become different from each other;

FIGS. 20A and 20B illustrate examples of the arrangement of a cell for a main beam and cells for sub beams in a light receiving element according to the embodiment of FIG. 19;

FIGS. 23A to 23C illustrate a plurality of shapes of a DOE for removing interlayer interference when a typical 3 beam DPP method is used;

FIGS. 27A and 27B illustrate embodiments in which the positions of sub beams are changed in a PDIC through a combination of a grating for a 1 beam DPP method and a DOE for removing interlayer interference;

FIGS. 29A to 29C illustrate examples in which various shapes of a DOE for removing interlayer interference and a diffraction grating for a 1 beam DPP method are implemented in a single plane;

FIGS. 30A to 30C illustrate examples of the grating direction and diffraction direction of a diffraction grating and the implementation of a blazed type-HOE.

DETAILED DESCRIPTION OF PREFFERRED EMBODIMENTS

Hereinafter, embodiments of the present invention will be described in detail with reference to the attached drawings.

In a DPP method using 3 beams, sub beams are focused on a disc while being spaced apart from a main beam by a ½ track pitch. In a typical case where an objective lens is disposed on the central axis of a disc, the relative positions of the main beam and the sub beams are not changed regardless of the inner and outer circumferences of the disc.

Figure 3:
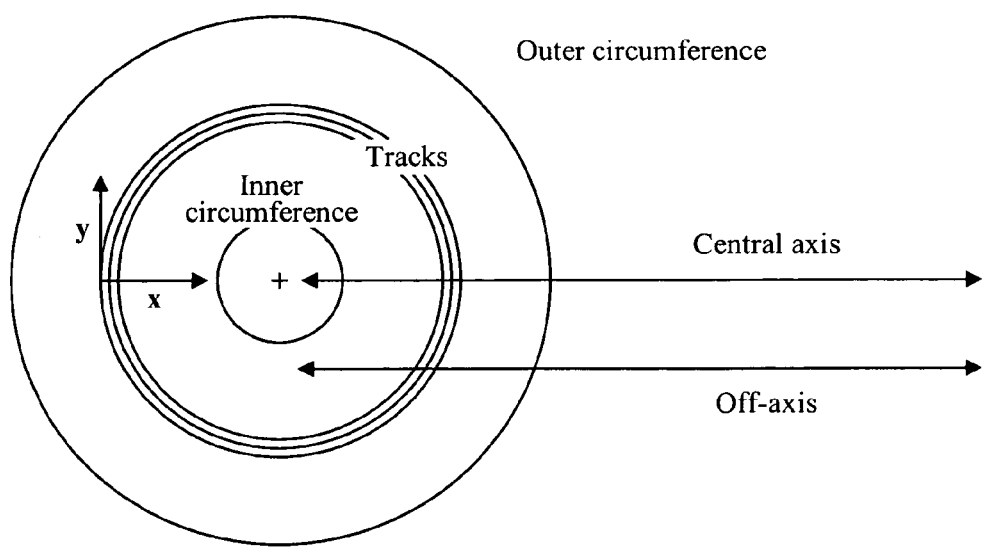
FIG. 3 illustrates an example in which one objective lens deviates from the central axis of a disc and is arranged off-axis when two objective lenses mounted on a single actuator are arranged in a track direction.
Figure 4:
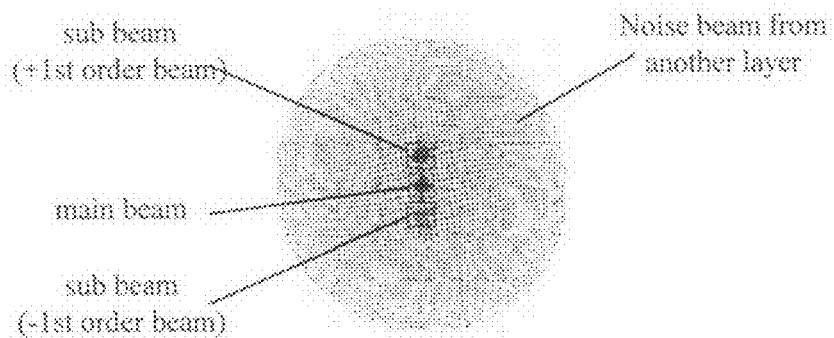
FIG. 4 illustrates the state in which noise light reflected from another layer flows into photodetectors.
Figure 6:
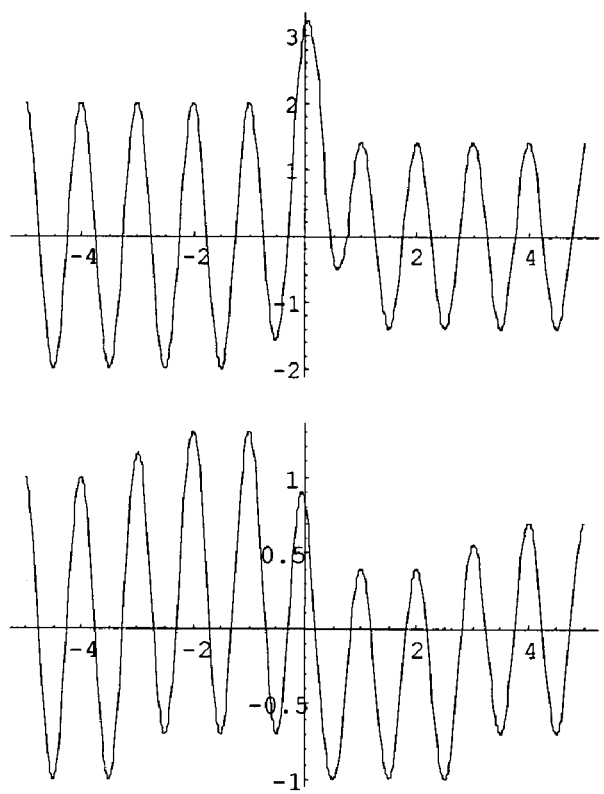
FIG. 6 illustrates the phenomenon in which the offset of a DPP signal increases at the boundary of recording/non-recording areas and the interval of the generation of the offset is lengthened when an objective lens is arranged off-axis and a 3 beam DPP method is used.

However, in the case of an off-axis arrangement, in which an objective lens is operated while deviating from the central axis of a disc, as shown in FIG. 3, the relative positions of the main beam and the sub beams on the track of the disc are changed according to the inner/outer circumference of the disc. In this case, there is a problem in that, as shown in FIG. 6, the offset of a DPP signal increases at the boundary of recording/non-recording areas of the disc, and the interval during which the offset occurs is lengthened.

The difference between the recording and non-recording areas is represented by the difference between the reflectivities thereof. In a 3-beam DPP method, when an objective lens moves over the recording/non-recording areas, differences between the levels of DPP signals in respective areas are made.

The offset of a DPP signal at the boundary of the recording/non-recording areas is generated due to the difference between times for which beams enter the recording/non-recording areas when 3 beams are used. In order to solve this problem, a method of causing only a single beam to be incident on a disc, causing beams separated by and reflected from the track structure of the disc to pass through a predetermined diffraction grating and to generate a main beam and sub beams, and canceling an offset from the push-pull signal of the main beam using the sub beams, that is, a so-called 1 beam DPP method, was proposed by the applicant of the present invention. This method is described below.

FIGS. 7A to 7C illustrate the comparison of a 3 beam DPP method with a 1 beam DPP method. In the 3 beam DPP method, a beam emitted from a Laser Diode (LD) is separated into three beams through a grating, the three beams are incident on and reflected from a disc, and the reflected three beams are focused on the main cell and sub cells of a Photo-Detector (PD). In contrast, in the 1 beam DPP method, only a single beam is incident on a disc and is reflected from the disc while being separated by the track structure of the disc, and the reflected beams form a main beam and two sub beams, from which AC components are removed, through a predetermined diffraction grating, and the main beam and sub beams are focused on the main cell and sub cells of a PD.

A principal object of using sub beams in a DPP method is to cancel the offset generated in the main beam due to the radial shift of the objective lens, and thus a secondary effect, such as increase in the level of a DPP signal caused by the AC component generated in the push-pull signals of the sub-beams, can be obtained.

In the method proposed by the applicant of the present invention, the beams, reflected from and separated by the track structure of a disc (the lands/grooves of the track function as a diffraction grating) pass through a diffracting grating and form a main beam, and beams diffracted by the pattern having a predetermined shape in the diffraction grating form sub beams.

Since the main beam, formed by passing through the diffraction grating, contains both an AC component that reflects the position of a beam, focused on the disc, on the track and a DC component that reflects the amount of the radial shift of the objective lens, both an AC component and a DC component are contained in the push-pull signal of the main beam.

The pattern of the diffraction grating has a shape allowing only a beam corresponding to the DC component (offset), other than the beam corresponding to the AC component, among the beams reflected from and separated by the track structure of the disc, to be diffracted. Therefore, only a DC component is contained in the push-pull signals of sub-beams diffracted and generated by the pattern.

Therefore, the offset corresponding to the radial shift of the objective lens, which is contained in the push-pull signal of the main beam, which passes through the diffraction grating without change, can be effectively canceled using the push-pull signals of the sub beams.

Further, as described above, in the conventional 3 beam DPP method, three beams are incident on a disc, and error occurs in a tracking error signal due to the difference between the times for which the three beams enter the boundary of recording and non-recording areas. However, in the 1 beam DPP method, since only a single beam is incident on the disc, a stable tracking error signal is obtained even at the boundary of the recording/non-recording areas.

Figure 8:
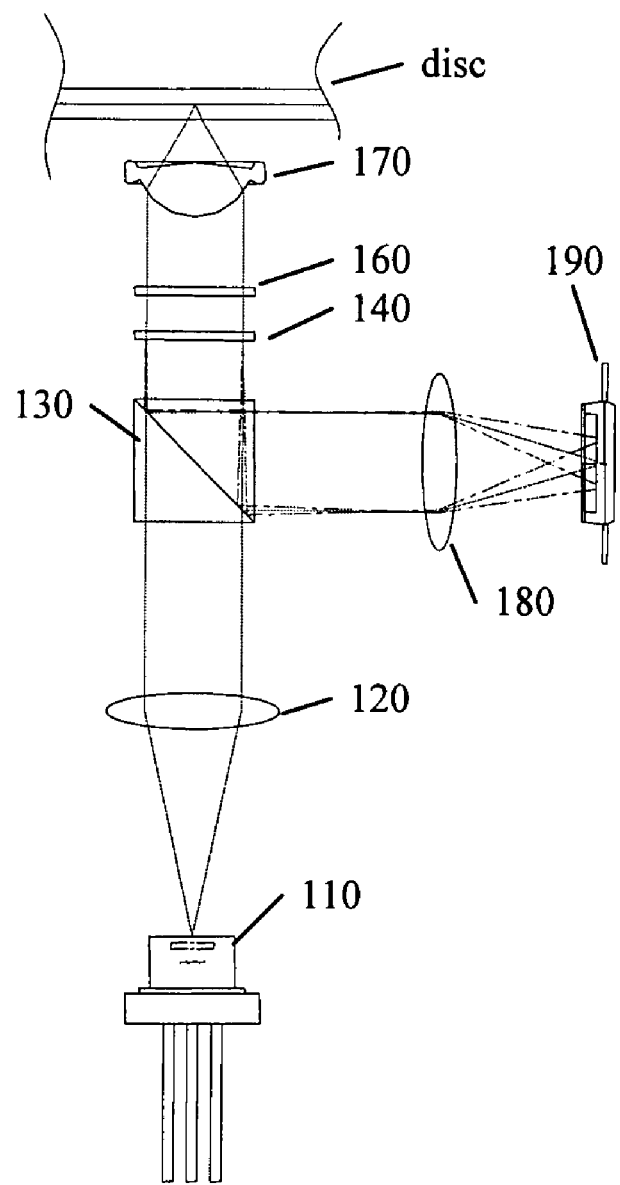
FIG. 8 illustrates an embodiment of an optical pickup device to which a 1 beam DPP method is applied.

FIG. 8 illustrates the construction of an optical pickup device to which the 1 beam DPP method is applied.

The optical pickup device 100 of FIG. 8 includes a light source 110, a collimator lens 120, a beam splitter 130, a diffraction grating 140, a Quarter Wave Plate (QWP) 160, an objective lens 170, a sensor lens 180, and a photodetecting means (or a photodetector: PD) 190. A disc is mounted on the side on which the focus of the objective lens 170 is formed.

The light source 110 emits a laser beam, and the collimator lens 120 converts the beam emitted from the light source into collimated light. In the present invention, the light source 110 and the collimator lens 120a may be combined into a single light emission unit. Further, when a diffused beam, emitted from the light source, rather than collimated light, is used without change in an optical system, the collimator lens 120 may be omitted. The beam splitter 130, which is a beam separation means, passes an incident beam toward the diffraction grating 140, and reflects the beam, reflected from the disc, toward the sensor lens 170, according to the polarization direction of the incident beam.

The quarter wave plate 160 for rotating the polarization of the beam converts a linearly polarized beam, emitted from the light source 110, for example, a P-polarized beam, into a circularly polarized beam, and converts the beam, reflected from the disc as another circularly polarized beam, into another linearly polarized beam, for example, an S-polarized beam.

The beam focused on the disc through the objective lens 170 is reflected and diffracted from the disc having a land/groove structure and is then converted into a 0th order beam and a +1st order beam, which are directed toward the objective lens 170 again. The circularly polarized beam reflected from the disc is converted into a collimated beam through the objective lens 170, and the collimated beam is converted into a linearly polarized beam while passing through the quarter wave plate 160. The sensor lens 180 generates astigmatism for a beam which is reflected from the disc and is incident on the sensor lens 180 while the optical path thereof is changed through the beam splitter 130, and transmits the beam with the astigmatism to the photodetecting means 190.

In the diffraction grating 140, a grating pattern is formed such that an area in which the circular patterns of ±1st order beams and the circular pattern of a 0th order beam overlap each other in the circular patterns of diffracted beams that are generated while the beam is reflected from and separated by the disc, is not received by PD cells for sub beams in the photodetecting means 190.

That is, the beams that are formed while being separated by and reflected from the disc form a main beam and sub beams through the diffraction grating 140. The main beam, passing through the diffraction grating 140 without change, is received by the main cell of the photodetecting means 190, that is, a light receiving element, and is detected as a Main beam Push-pull (MPP) signal. The two sub beams, generated while being diffracted by the pattern having a predetermined shape in the diffraction grating 140, are received by the sub cells of the photodetecting means 190 and are then detected as a first Sub beam Push-Pull (SPP) signal (SPP1) and a second SPP signal (SPP2).

In order to detect the MPP signal and the SPP signals, the main cell of the photodetecting means 190 is divided into at least two parts in directions corresponding to a radial direction and a tangential direction, respectively, and each sub cell of the photodetecting means 190 is divided into at least two parts in the direction corresponding to the radial direction.

Figure 9:
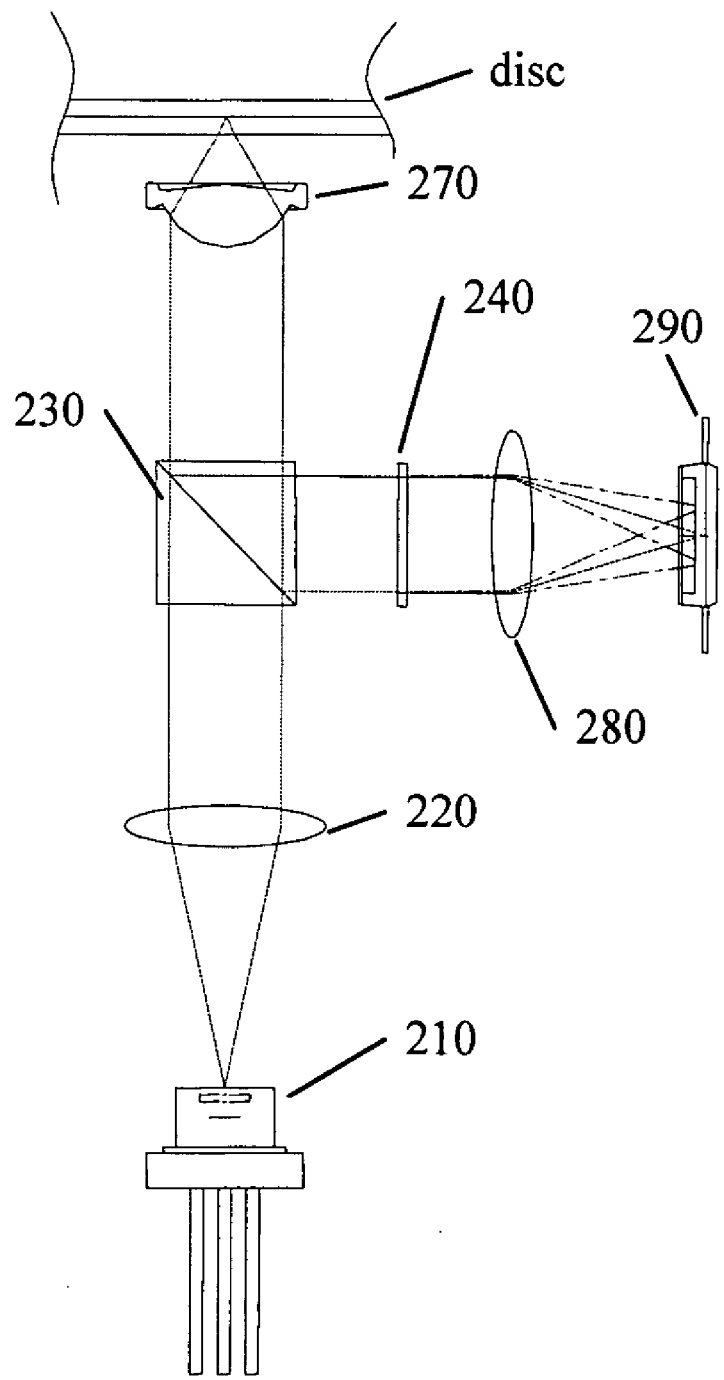
FIG. 9 illustrates another embodiment of an optical pickup device to which a 1 beam DPP method is applied.

FIG. 9 illustrates another construction of an optical pickup device to which the 1 beam DPP method is applied. The optical pickup device 200 of FIG. 9 includes a light source 210, a collimator lens 220, a beam splitter 230, a diffraction grating 240, an objective lens 270, a sensor lens 280, and a photodetecting means 290. A disc is mounted on the side on which the focus of the objective lens 270 is formed.

The optical pickup device 200 of FIG. 9 has a construction similar to that of the above-described optical pickup device 100 of FIG. 8, but there is a difference therebetween in that the quarter wave plate 150 of the optical pickup device 100 of FIG. 8 is not provided, and the diffraction grating 240 is interposed between the beam splitter 230 and the sensor lens 280. With the exception of the difference, the construction and operation of the optical pickup device 200 of FIG. 9 are the same as those of the optical pickup device 100 of FIG. 8.

Figure 10:
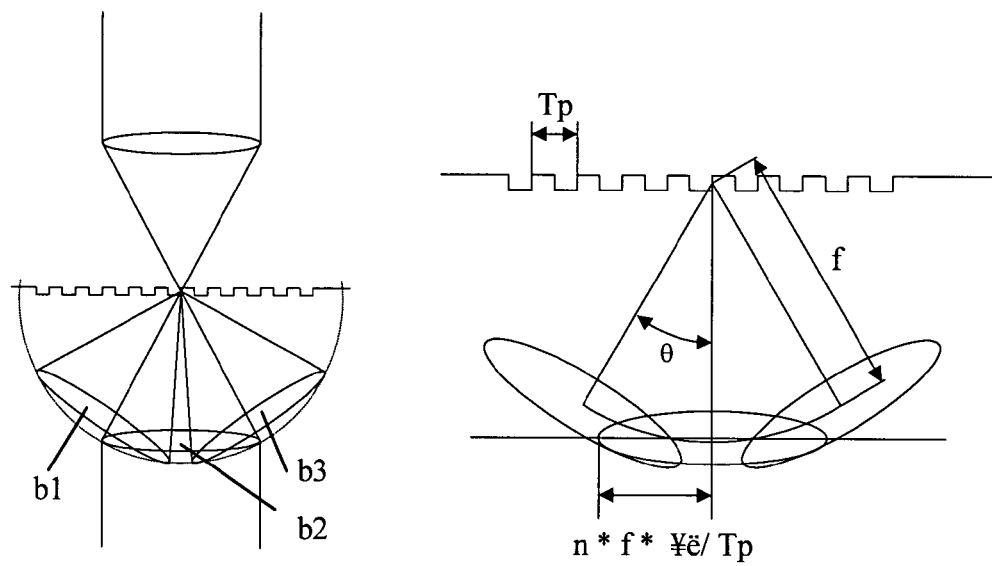
FIG. 10 illustrates a shape in which a beam incident on a disc for recording is separated.

FIG. 10 exemplarily illustrates a shape in which a beam incident on a disc for recording is separated.

When viewed from the focal point of an objective lens, the beam incident on the disc for recording through an objective lens is separated into a +1st order beam, a 0th order beam and a −1st order beam while forming a predetermined angle (θ) when being reflected from the disc, as shown in FIG. 10. This is due to the track structure (land/groove) of the disc for recording having a predetermined Track Pitch (TP), so that the land and groove of the disc for recording have protruded/depressed sections, and thus cause an effect similar to a diffraction grating.

The 0th order beam (b2), the +1st order beam (b1), and the −1st order beam (b3), which are reflected from and separated by the disc, form circular patterns and are directed toward the objective lens. The sizes of the circular patterns of the beams are the same as that of the Entrance Pupil Diameter (EPD) of the objective lens. When the focal distance of the objective lens is f and the numerical aperture is NA, EPD is 2×f×NA.

Further, as shown in FIG. 10, the +1st order beam (b1) and the −1st order beam (b3) are moved to the left or right. The amount of movement is f×λ/Tp when the track pitch of the disc is Tp and the wavelength of the laser beam is λ.

Figure 11:
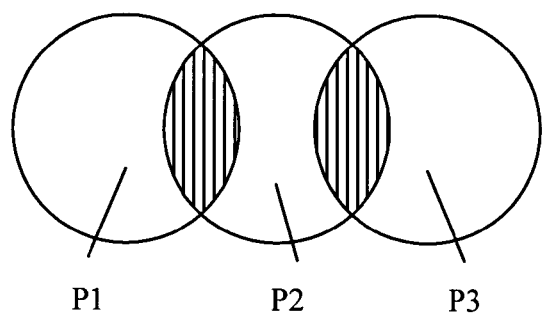
FIG. 11 exemplarily illustrates a baseball pattern formed when a beam incident on a disc for recording is separated.

The circular pattern P2 of the 0th order beam at the center forms the pattern of FIG. 11 because it overlaps with part of the circular pattern P1 and circular pattern P3 of the +1st and −1st order beams, which are moved to the left or right due to the track structure of the disc (this indicates the state before the beams diffracted by the disc pass through the objective lens). This circular pattern is called a baseball pattern because it resembles the shape of a baseball.

In this case, the sizes and the overlapping extents of the circular patterns P1, P2 and P3 differ from each other according to the type of disc. In the case of a BD or DVD-RW, since the amount of the movement is large, the overlapping extent is relatively low, and thus the pattern of FIG. 10 is formed. The AC components of the push-pull signals (in the case of a 3 beam DPP method, MPP and SPP signals) are generated by the portions in which the 0-th order beam and the +/−1st order beams overlap each other (hatched regions) in the baseball pattern of FIG. 11.

FIG. 12 schematically illustrates the principles that AC component-removed sub beams are obtained from the beams reflected from and separated by a disc.

A beam incident on a disc is diffracted into three beams by the track structure of the disc. The center beam of the three diffracted beams is defined as a 0th order beam, and the beams formed to the left and right of the 0th order beam are defined as +/−1st order beams. The three beams (0th order beam and +/−1st order beams), separated from the beam incident on the disc, overlap each other in some region (P7), thus forming the baseball pattern.

The pattern of the diffraction grating, shown in FIG. 12 as an embodiment, is designed to diffract only a 0th order beam (P5), but not the portions in which the 0th order beam and the +/−1st order beams overlap each other in the baseball pattern, thus allowing the diffracted beam to be received by a photodetector for sub beams, and thus preventing the +/−1st order beams (P4, P6, and P7), including the portions in which the 0th order beam and the +/−1st order beams overlap each other, from being received by the photodetector for the sub beams.

However, the main beam, formed by passing through the diffraction grating without change, reflects the baseball pattern regardless of the pattern of the diffraction grating, and is thus focused on the main cell of the light receiving element. Accordingly, both an AC component and a DC component are contained in the push-pull signal of the main beam (MPP).

The 0th order beam (P5), other than the portions in which the 0th order beam and +/−1st order beams overlap each other in the baseball pattern, is diffracted by the grating pattern, indicated by a hatched portion, and is received by the photodetector (sub cell) for sub beams. Accordingly, only the offset of the main beam (DC component), but not an AC component, is contained in the push-pull signal of the sub beams (SPP).

Therefore, the push-pull signal of the AC component-removed sub beam is subtracted from the push-pull signal of the main beam (MPP), and thus an offset-free tracking error signal can be obtained without using a 3 beam method of focusing three beams on a disc.

Figures 13A, 13B, 13C:
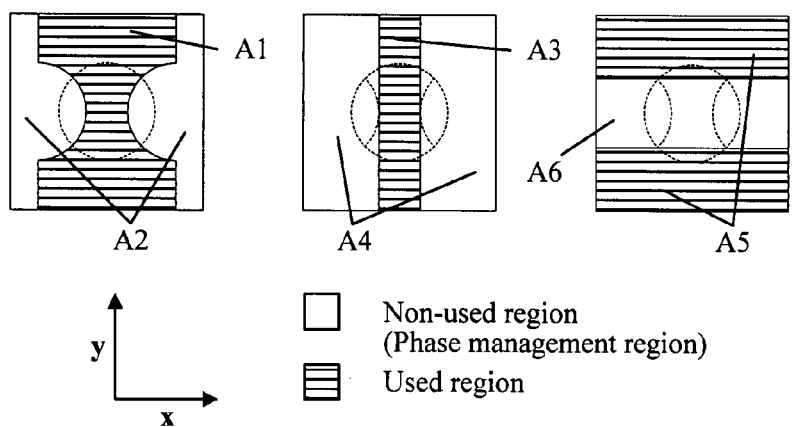
FIGS. 13A to 13C illustrate several embodiments of a diffraction grating for obtaining AC component-removed sub beams.

FIGS. 13A to 13C illustrate several embodiments of a diffraction grating for obtaining AC component-removed sub beams. The diffraction grating can be formed in patterns having various shapes.

As described above, a main beam, formed by passing through the diffraction grating of FIGS. 13A to 13C without change, reflects the entire baseball pattern, and thus both an AC component and an offset are contained in an MPP signal. However, only some regions of the beams, reflected from and separated by the disc, are diffracted by the first pattern A1, A3 and A5 corresponding to the usage area of the diffraction grating, thus forming sub beams.

The diffraction grating of FIG. 13A includes a first pattern A1 formed in the shape of a vertically standing hourglass ("I" shape) and a second pattern A2, formed in the region other than the first pattern A1, when the X axis is assumed to be the inner/outer circumferential direction (radial direction) and a Y axis is assumed to be a track direction (or tangential direction).

The first pattern A1 is formed in the region other than the circular pattern regions (P1 and P3 of FIG. 11) of ±1st order beams b1 and b3, that is, the region (P5 of FIG. 12) other than the region (P7 of FIG. 12), in which the circular pattern region of the 0th order beam b2 (P2 of FIG. 11) and the circular pattern regions (P1 and P3) of the ±1st order beams b1 and b3 overlap each other, and the regions P4 and P6 of FIG. 12.

Further, the upper/lower ends of the first pattern A1 (rectangular portions other than central circular depressions) may extend to both sides of the diffraction grating within the range in which the circular pattern regions P4 and P6 of the ±1st order beams b1 and b3 are not invaded.

The diffraction grating of FIG. 13B is formed to include a first pattern A3, having a vertically long rectangular shape formed in a center portion, and a second pattern A4 formed to the left and right of the first pattern A3. In this case, the location and width of the first pattern A3 are important factors. The first pattern A3 has a rectangular shape that excludes the circular patterns P1 and P3 of the ±1st order beams b1 and b3. That is, it is preferable that the location and width of the first pattern A3 in the direction of x be determined such that both sides of the first pattern A3 come into contact with the edges of the circular patterns P1 and P3 of the ±1st order beams, disposed within the circular pattern P2 of the 0th order beam.

The diffraction grating of FIG. 13C includes a second pattern A6 having a horizontally long rectangular shape formed in a center portion and a first pattern A5 formed on and beneath the second pattern A6. In this case, it is preferable that the location and width of the first pattern A5 in the direction of y be determined by the lines for respectively connecting two upper points and two lower points among the four points at which the boundary of the circular pattern P2 of the 0th order beam b2 intersect the boundaries of the circular patterns P1 and P3 of ±1st order beams b1 and b3.

Figure 14:
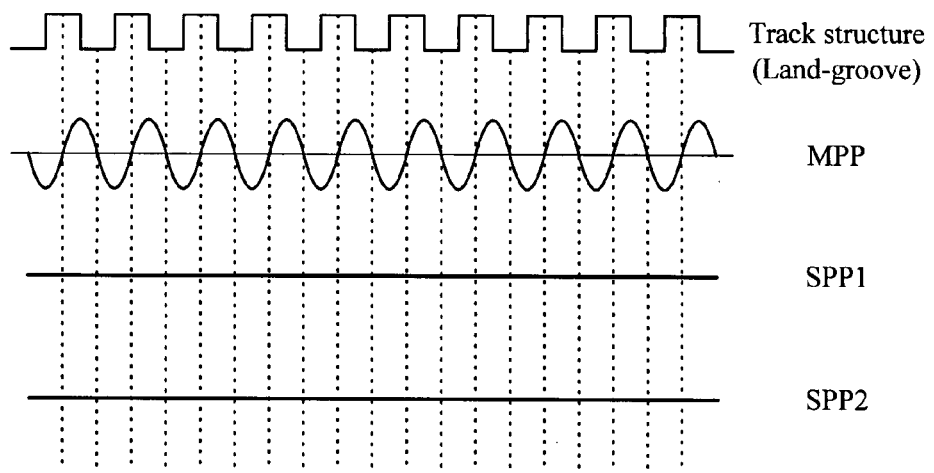
FIG. 14 illustrates the result in which only a DC component remains in and an AC component is removed from the push-pull signals of sub beams through the diffraction grating of FIG. 12.

FIG. 14 illustrates the result in which only a DC component remains in, and an AC component is removed from, the push-pull signals of sub beams through the diffraction grating of FIGS. 13A to 13C. It can be seen in FIG. 14 that the push-pull signal of a main beam (MPP) is not influenced by the diffraction grating, whereas AC components are removed from the push-pull signals of the sub beams (SPP).

The removal of the AC components from the push-pull signals of sub beams (SPP) means that phase variation in the AC components caused by variation in track pitch is eliminated, so that a problem that may occur due to the off-axis arrangement of an objective lens, indicating the state in which the objective lens deviates from the central axis, can be solved.

In this case, the DC level (offset) of the SPP signal is closely related to the amount of movement of the objective lens, that is, the amount of radial shift, indicating the movement of the objective lens from the center of an actuator to the inner/outer circumferences of the disc.

Generally, since the offsets (DC levels) of the MPP signal and the SPP signals increase to some degree in proportion to the increase in the amount of radial shift of the objective lens, it can be considered that the offset of the push-pull signal has linear properties in that it is proportional to the amount of radial shift of the objective lens.

Therefore, when variation in the DC level (slope) of the MPP signal relative to the amount of radial shift of the objective lens is assumed to be a, and variation in the DC level of the SPP signals relative to the amount of radial shift of the objective lens is assumed to be b, the offset of the MPP signal, generated due to the movement of the objective lens, can be canceled using a proportional constant k=½b in the equation of DPP=MPP−k×(SPP1+SPP2).

Figure 15A:
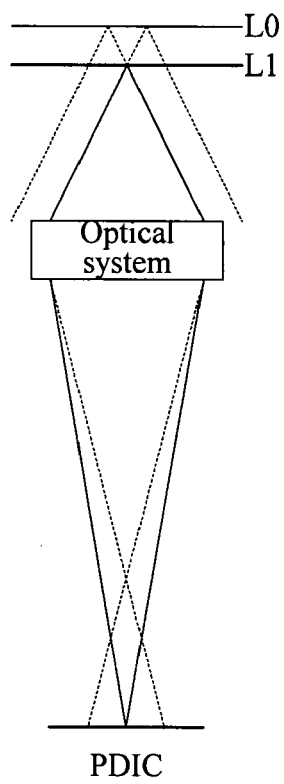
FIGS. 15A and 15B illustrate examples in which a beam, reflected from another layer, is incident on a Photodetector Integrated Circuit (PDIC) when the current layer of an optical disc, having two or more layers, is recorded or reproduced.
Figure 15B:
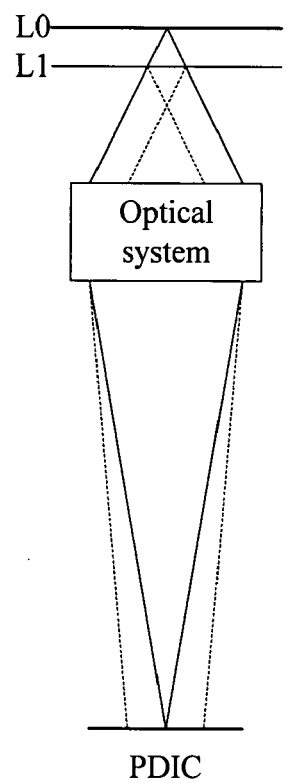

In an optical disc having two or more layers, a semi-transmissive layer is formed to reproduce data from another recording layer, and transmissivity differs for respective discs. As shown in FIGS. 15A and 15B, when a recording layer close to the incident surface of an optical disc is assumed to be L1, and a recording layer distant from the incident surface is assumed to be L0, FIG. 15A shows the case where data is recorded on or reproduced from the layer L1, and FIG. 15B shows the case where data is recorded on or reproduced from the layer L0.

FIGS. 15A and 15B illustrate the case where interlayer movement is performed according to variation in the location of the objective lens constituting an optical system without changing the locations of a disc and a Photodetector Integrated Circuit (PDIC). In FIG. 15A, light reflected from the layer L0 other than the current layer L1, on which reproduction or recording is currently performed, is focused in front of the PDIC. In FIG. 15B, light reflected from the layer L1 is focused behind the PDIC.

Figure 5A:
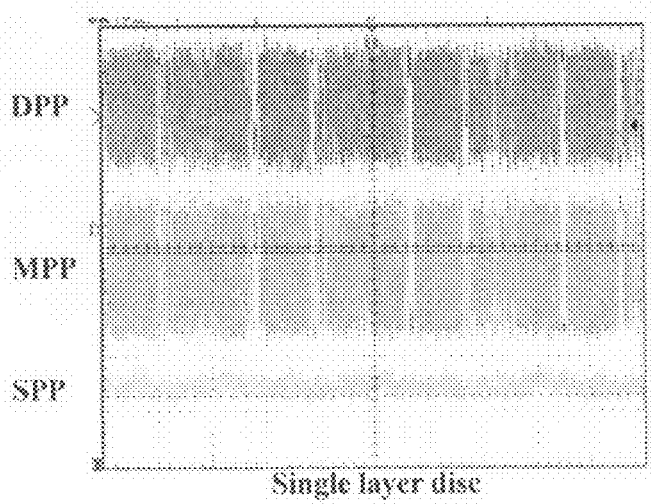
FIGS. 5A and 5B illustrate an example in which a tracking error signal is distorted due to interlayer interference in a disc having two or more recording layers.
Figure 5B:
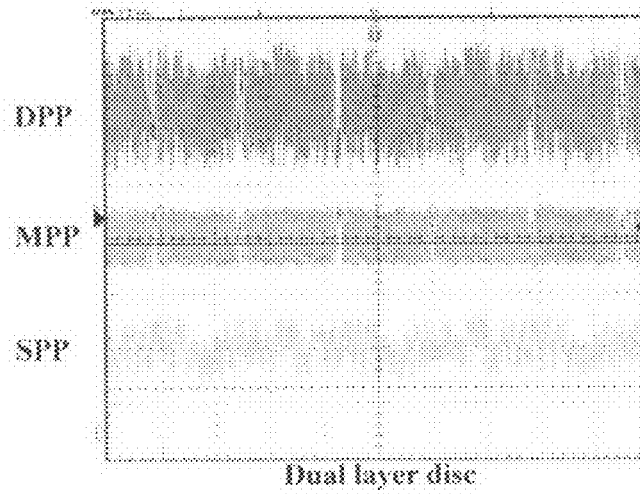

FIGS. 5A and 5B illustrate the influence of noise on a dual layer disc caused by a numerical aperture limiting method. FIG. 5A illustrates the case of a single layer disc, and FIG. 5B illustrates the case of a dual layer disc, which show that there is no influence on an MPP signal, but that a large amount of noise is included in an SPP signal, and consequently a DPP signal is distorted.

That is, noise occurs in the SPP signal due to the interference between the beam output from the other layer and the sub beams of a reproduced signal. Therefore, if the beam output from the other layer is prohibited from flowing into the regions of sub beams (or up to the region of the main beam), that is, the sub cells for receiving sub beams, the deterioration of a DPP signal caused by interlayer interference can be prevented.

Figure 1:
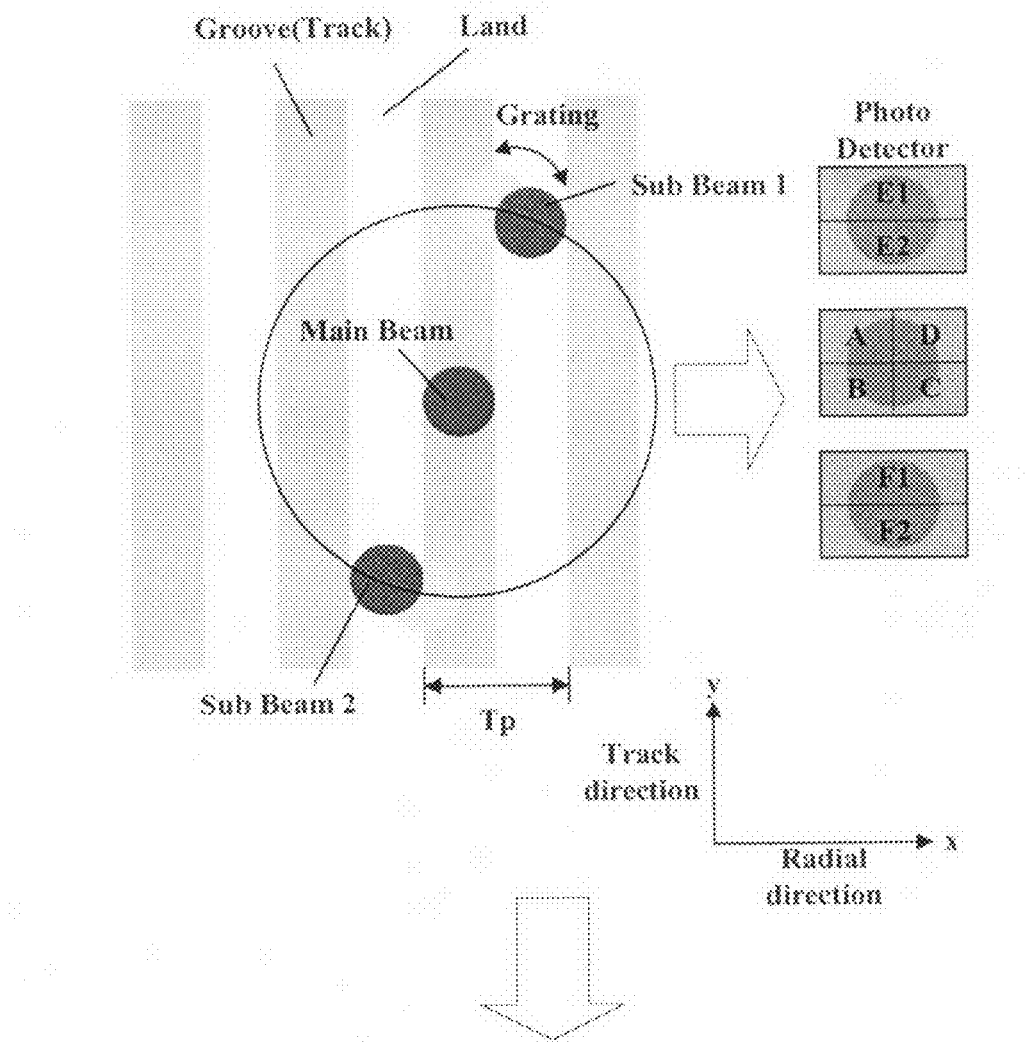
FIG. 1 illustrates the principles of the detection of a tracking error signal based on a DPP method.
Figure 2:
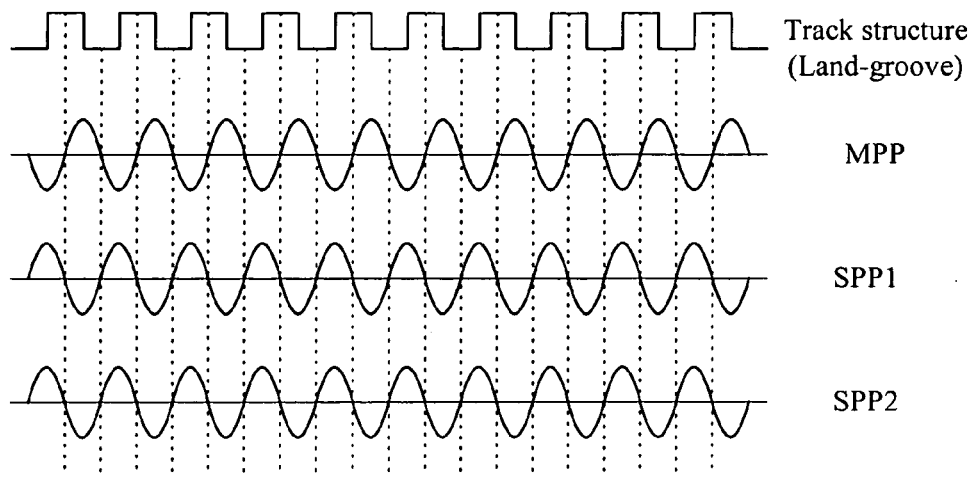
FIG. 2 illustrates push-pull signals generated based on a 3 beam DPP method.

This procedure is analytically described below. When the beams focused on the sub cells, that is, sub 1 (E1/E2) and sub 2(F1/F2) of FIG. 1, are assumed to be $\psi_{sub,+1}$ and $\psi_{sub,+2}$, the beams and the quantity of the beams are defined by the following equations.

$$\psi_{sub,+1} = \psi_{0,+1} + \psi_{1,0} + \psi_{1,+1} + \psi_{1,-1}$$

$$I_{sub,+1} = |\psi_{0,+1}|^2 + |\psi_{1,0}|^2 + |\psi_{1,+1}|^2 + |\psi_{1,-1}|^2 +$$
$$2V_0[|\psi_{1,0}||\psi_{1,+1}|\cos(\phi_{1,0} - \phi_{1,+1}) +$$
$$|\psi_{1,0}||\psi_{1,-1}|\cos(\phi_{1,0} - \phi_{1,-1}) +$$
$$|\psi_{1,+1}||\psi_{1,-1}|\cos(\phi_{1,+1} - \phi_{1,-1})] +$$
$$2V_{01}[|\psi_{0,+1}||\psi_{1,0}|\cos(\phi_{0,+1} - \phi_{1,0}) +$$
$$|\psi_{0,+1}||\psi_{1,+1}|\cos(\phi_{0,+1} - \phi_{1,+1}) +$$
$$|\psi_{0,+1}||\psi_{1,-1}|\cos(\phi_{0,+1} - \phi_{1,-1})]$$

In this case, the first subscript denotes the layer and the latter subscript denotes the order of diffraction. $\psi_{0,+1}$ denotes the beam reflected from the layer L0 and diffracted by the diffraction grating in the +1st order, $\phi$ denotes phase, and V denotes visibility. Only principal factors are summarized below.

$$I_{sub,+1} \approx |\psi_{0,+1}|^2 + |\psi_{1,0}|^2 + 2V_{01}|\psi_{0,+1}||\psi_{1,0}|\cos(\phi_{0,+1} - \phi_{1,0})$$

That is, if $\psi_{1,0}$ is removed, the noise of a dual layer is removed. In other words, since the 0th order beam flowing from the other layer is the greatest noise, the cause of the noise can be removed by suitably reducing or removing the 0th order beam.

In order to remove the 0th order beam flowing from the other layer, two methods can be considered. One is a method of causing part of the light incident on a disc to be diffracted to a different location using a diffractive element (Diffractive Optical Element: DOE), such as a diffraction grating or a hologram element (Holographic Optical Element: HOE), thus reducing or removing the quantity of light. The other is a method of applying the same method to the part of the light that is reflected from a disc and is received by a PDIC.

The first method is problematic in that it greatly influences the quality of the beam incident on the disc, thus greatly deteriorating recorded or reproduced signals. Therefore, the first method is not suitable. The second method, that is, the method using the DOE in an optical path in which the beam is reflected from the disc and is received by the PDIC, is preferable.

In the present invention, the concept of the DOE is used to integrally designate elements that use diffraction, such as a diffraction grating and an HOE.

Figure 16A:
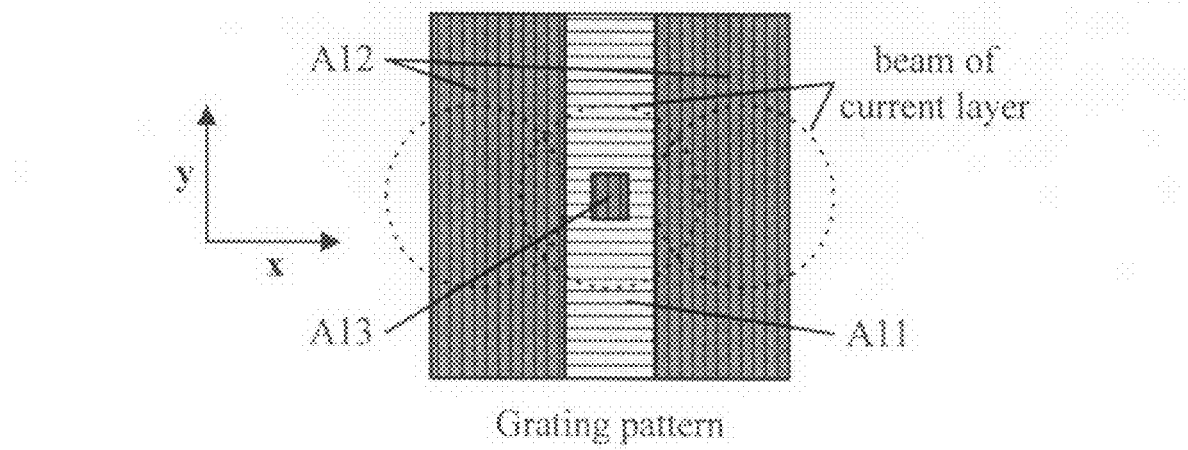
FIGS. 16A and 16B illustrate a diffraction grating for removing interlayer interference according to an embodiment of the present invention and the distribution of beams on PDs.
Figure 16B:
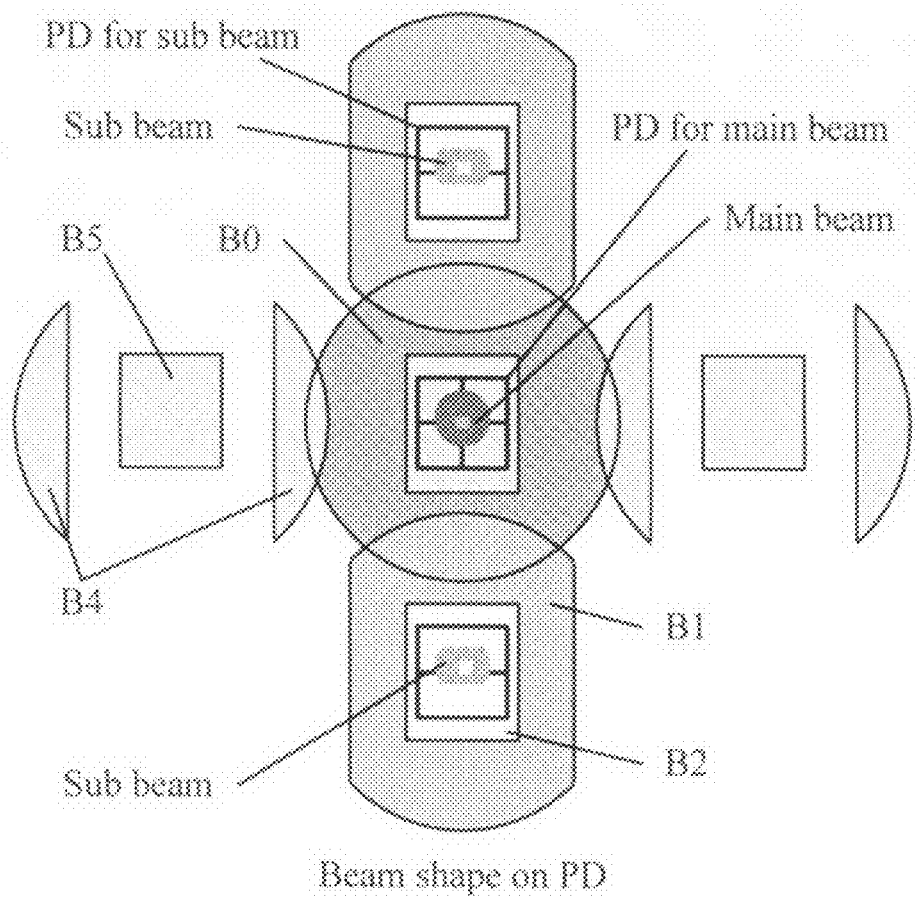

FIGS. 16A and 16B illustrate a diffraction grating for removing interlayer interference according to an embodiment of the present invention and the distribution of beams on PDs. The diffraction grating of FIG. 16A according to an embodiment of the present invention can be applied to the diffraction grating 140 or 240 of the optical pickup device of FIG. 8 or 9.

In the pattern of the diffraction grating, the case where the grating direction of phase management regions A12 and A13 and the grating direction of a usage region A11 are at an angle of 90 degrees is shown as an example. In FIGS. 16A and 16B, A11 has a grating formed in a horizontal direction, and A12 and A13 have gratings formed in a vertical direction. Therefore, the beams diffracted by the A11 are arranged above and below the beam passing through the diffraction grating without change, and the beams diffracted by the A12 and A13 are disposed to the left and right of the beam passing through the diffraction grating without change.

The diffracting grating of FIG. 16A is similar to the diffraction grating of FIG. 13B, except that the pattern A13 is formed within the pattern A11. As described above, with reference to FIGS. 12 and 13, A11 (A3 of FIG. 13B) and A12 (A4 of FIG. 13B) form a combination of patterns required to generate sub beams for canceling the offset of the main beam (corresponding to the radial shift of an objective lens) in a 1 beam DPP method, and are designed such that an AC component is not included in the sub beams.

For this operation, the pattern A11 is formed in a rectangular shape so that the circular patterns P1 and P3 of the ±1st order beams b1 and b3 in a baseball pattern formed by three beams (0th order beam and +/-1st order beams) generated when a beam is reflected from a disc are not included in the sub beams. The sub beams diffracted by the pattern A11 are focused on PDs (sub cells of a light receiving element) for receiving the sub beams.

Of course, a main beam passing through the diffraction grating of FIG. 16A without change is focused on a PD for receiving the main beam (main cell of a light receiving element), and is used for an RF signal, a focus signal and a push-pull signal. The main beam and the sub beams have a quantity of light that varies according to the outer shape of the pattern A11, the shapes of depressions and protrusions forming the pattern A11, etc.

The beam reflected from another layer (adjacent layer) other than the current layer, on which recording or reproduction is currently performed, passes through the diffraction grating of FIG. 16A without change and is focused on the PD for the main beam. The focused beam is diffracted by the pattern A11 of FIG. 16A and is also focused on the PDs for sub beams. The beam reflected from the adjacent layer further influences sub beams having a relatively small quantity of light, and thus greatly influences a tracking error signal that uses the sub beams.

The present invention is implemented to prevent a beam, reflected from an adjacent layer, from flowing into the PDs for sub beams, thus preventing a tracking error signal from being degraded due to interlayer interference. The first case where a tracking error signal is degraded is the case where a beam, reflected from an adjacent layer and passing through the diffraction grating of FIG. 16A without change, is incident on the PDs for sub beams, and the second case is the case where a beam, reflected from the adjacent layer and diffracted by the A11 of FIG. 16A, is incident on PDs for sub beams.

As a method of solving the problem of the first case, the present invention adjusts the depressed/protruded shapes of A11 (determines the angle of diffraction) and the location of PDs for sub beams such that sub beams of a current layer, diffracted by the A11, are arranged out of the effective radius of the beam from an adjacent layer, which passes through the diffraction grating of FIG. 16A without change.

For this method, as shown in FIGS. 17A and 17B, PDs for sub beams are arranged farther away from a Pd for a main beam than PDs for detecting sub beams in the conventional DPP method. That is, the distance between a PD cell for a main beam and PD cells for sub beams are set to be large. For example, the distance D between the PD cells for sub beams and the PD cell for a main beam according to the present invention is set to be 5 times or more the distance d between the PD cells for sub beams and the PD cell for a main beam in the conventional DPP method. Further, as shown in FIG. 17B, light receiving elements can be arranged to include all of PDs for conventional DPP detection and 1 beam DPP detection of the present invention.

As a method of solving the problem of the second case, the present invention is implemented to form the A13, having a grating direction different from that of the A11, within the A11 so that sub beams from an adjacent layer, diffracted by the A11, are not focused on the PDs for sub beams designed to receive the sub beams of the current layer diffracted by the A11.

The outer shape of the pattern A13 is designed such that the region of the pattern A13 corresponds to the region in which a beam capable of influencing the region in which the PDs for sub beams are disposed (region B2 of FIG. 16B), among beams output from the adjacent layer and diffracted by the pattern A11, passes through the diffraction grating of FIG. 16A.

A beam reflected from the adjacent layer passes through the diffraction grating of FIG. 16A without change and is focused on the PD for a main beam in the shape of B0.

Further, the beam reflected from the adjacent layer is diffracted by the A11 of FIG. 16A and is focused on the regions arranged above and below the main beam in the shape of B1. In this case, since the grating direction of the A13 within the A11 is different from that of A11, the beam from the adjacent layer does not flow into the PDs for sub beams (region B2 of FIG. 16B)

Further, part of the beam reflected from the adjacent layer is diffracted by the A12 of FIG. 16A and is focused on the regions to the left and right of the main beam in the shape of B4, and other part thereof is diffracted by the A13 of FIG. 16A and is focused on the regions to the left and right of the main beam in the shape of B5. The empty space between the regions B4 and B5 in FIG. 16B is formed because the beam reflected from the adjacent layer is focused on the region B1 by the pattern A11.

A tracking error signal can be obtained from DPP=MPP−k×(SPP1+SPP2) using both an MPP signal, which is a push-pull signal obtained from the PD for a main beam, and SPP1 and SPP2 signals, which are push-pull signals obtained from the PDs for sub beams.

As described above, when it is assumed that the offsets of an MPP signal and SPP signals have linear properties, indicating that they are proportional to the amount of radial shift of the objective lens, and that the slope of the DC level of the MPP signal relative to the amount of radial shift of the objective lens is a and the slope of the DC level of SPP signals relative to the amount of radial shift of the objective lens is b, a proportional constant k can be obtained as k=½b.

Meanwhile, in FIG. 16B, among the beams diffracted by the A11, the sub beams reflected from the current layer have a shape (horizontally long shape) different from the shape of beams B1 reflected from the adjacent layer (vertically long shape).

Generally, in the sensor lens 170 or 270 for generating an astigmatism to obtain a focus error signal, the focuses of two axes, for example, x and y axes, are differently set for an incident beam, using a cylindrical lens, thus causing the middle of the focuses of the x and y axes to be a focusing position.

The lens for generating astigmatism functions to rotate the shape of a beam (light quantity distribution), which is incident to be focused between the focuses of two axes, by an angle of 90 degrees while maintaining the relative position of the incident beam. Further, the lens does not rotate the shape of a beam, which is incident to be focused out of the range between the focuses of two axes.

That is, a beam reflected from the current layer, on which the beam is in focus for recording or reproduction, has light quantity distribution rotated by an angle of 90 degrees while passing through the sensor lens 170 or 270. A beam reflected from the adjacent layer, on which the beam is out of focus, has light quantity distribution that is maintained without change, even though the beam passes through the sensor lens 170 or 270.

Therefore, of the beams passing through the A11 and having the shape of FIG. 18A and (vertically long shape), with left and right portions thereof being removed by the A12, the beam reflected from the current layer is converted into a horizontally long shape, as shown in FIG. 18B, while passing through a lens for generating an astigmatism, and a beam reflected from the adjacent layer maintains its vertically long shape, as shown in FIG. 18C, even after passing through the lens for generating an astigmatism.

Similar to this, of the beams passing through the A12, with the center portions thereof being removed and only left and right portions remaining due to the A11, a beam reflected from the adjacent layer is focused on the location deviating from the PD for a main beam and the PDs for sub beams while maintaining its original shape even after passing through a lens for generating an astigmatism, as in the case of B4 of FIG. 16B.

In the embodiments of the present invention, there is no need for the grating directions of A11 and A12 to be formed to be perpendicular. The grating direction and depressed/protruded shapes of the A12 need only be designed to prevent beams diffracted by the A12, among the beams reflected from the adjacent layer, from being focused on the PD for a main beam and PDs for sub beams. Therefore, the angle of diffraction of the A12 is set to increase even though the grating directions of A11 and A12 are identical to each other, thus preventing the beams diffracted by the A12 from being focused on the PD for a main beam and PDs for sub beams.

This fact is also applied in the same manner to the grating direction and depressed/protruded shapes of A13. Further, there is no need for the grating directions and the depressed/protruded shapes of A12 and A13 (the pitch and depth of depression/protrusion, the slopes of protrusion and depression, etc.) to be designed to be identical to each other.

Alternatively, the region A12 is not necessarily implemented using a grating, and it is possible for only the phase of the region A12 relative to the region A11 to be corrected merely by adjusting the thickness of the region A12.

Further, the location on which the sub beams are focused, the angle of diffraction, etc. can be adjusted by combining the pitch and depth of the depression/protrusion forming the pattern A11.

Further, the diffraction grating according to an embodiment of the present invention can be implemented such that the shapes of the patterns A11 and A12 are designed to be similar to the shapes of the patterns A1 and A2 of the diffraction grating of FIG. 13A except that the pattern A13 is formed within the pattern A11.

The diffraction grating of FIG. 16A according to the present invention can be applied to the diffraction gratings 140 and 240 of the optical pickup devices 100 and 200 of FIGS. 8 and 9. In the case of the optical pickup device 100 of FIG. 8, when the diffraction grating of FIG. 16A is interposed between the beam splitter 130 and the quarter wave plate 150, it is preferable to use a polarizing diffraction grating from the standpoint of optical efficiency so as to diffract only the beam reflected from a disc, without diffracting the beam incident on the disc. If optical loss can be endured, a non-polarizing diffraction grating can also be used. In the optical pickup device 200 of FIG. 9, since the diffraction grating 240 is not disposed on the path between the light source 210 and the disc, there is no need to use a polarizing diffraction grating.

In the optical pickup devices 100 and 200 of FIGS. 8 and 9, to which the present invention is applied, it is preferable that each of the diffraction gratings 140 and 240 according to the present invention be driven along with the objective lens 160 or 260, that is, that they be mounted together with the objective lens 160 or 260 in an actuator for supporting the objective lens 160 or 260 and performing a focusing servo operation and/or a tracking servo operation. Further, the diffraction gratings 140 and 240 according to the present invention can be mounted on the bases of the optical pickup devices 100 and 240, respectively, without being mounted on actuators.

Figure 19A:
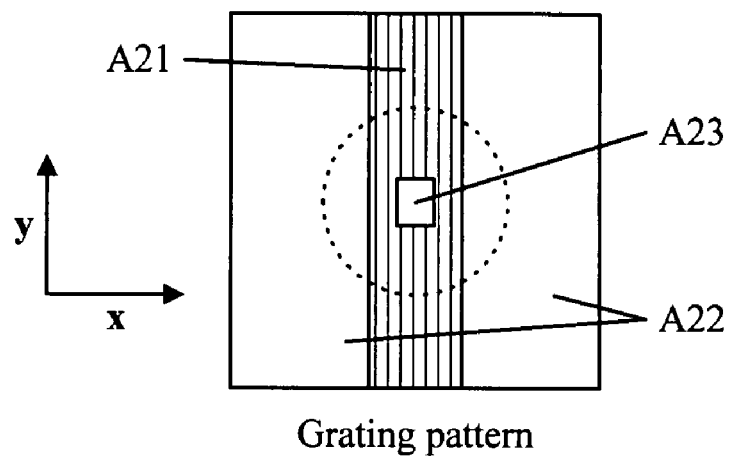
FIGS. 19A and 19B illustrate a diffraction grating for removing interlayer interference according to another embodiment of the present invention and the distribution of beams on PDs.
Figure 19B:
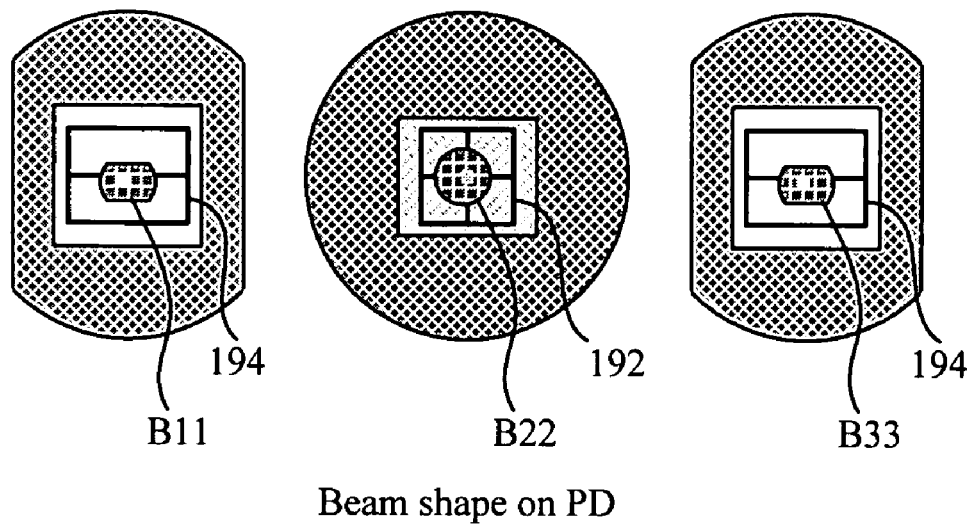

FIGS. 19A and 19B illustrate a diffraction grating for removing interlayer interference according to another embodiment of the present invention and the distribution of beams on PDs. In FIGS. 19A and 19B, the x direction denotes an inner/outer circumferential (radial) direction, and the y direction denotes a track direction.

The diffraction grating of FIG. 19A has a pattern similar to the pattern of FIG. 13B, and is characterized in that it further includes a region A23 for correcting the phase of a main signal based on a main beam, compared to the diffraction grating of FIG. 13B. The region A23 functions to correct the phase of the main signal, and also functions to block light reflected from an adjacent recording layer, other than the current recording layer or reproduction layer, from sub signals based on sub beams.

In FIG. 19A, a region A21 includes a grating formed in a vertical direction, and regions A22 and A23 include gratings formed in a horizontal direction, so that beams diffracted by the region A21 are disposed to the left and right of a beam, which passes through the diffraction grating without change, as shown in FIG. 19B.

The embodiment of FIGS. 16A and 16B is similar to the embodiment of FIGS. 19A and 19B, except that the grating directions of corresponding regions are opposite each other. However, the shape and location of sub cells for receiving sub beams diffracted by the diffraction grating are different from each other between the two embodiments. Similar to the embodiment of FIGS. 16A and 16B, the region A22 is not necessarily implemented using a grating, but only the phase of the region A22 relative to the region A21 can be corrected.

FIG. 19B illustrates an example of the pattern of diffracted beams passing through the diffraction grating of FIG. 19A in a multi-layer recording medium and the arrangement of cells in a photodetecting means based on the pattern. In this case, B11, B22, and B33 denote beams which pass through the diffraction grating after being reflected from a recording layer or reproduction layer. B11 and B33 denote sub beams diffracted by the diffraction grating of FIG. 19A, and B22 denotes a main beam passing through the diffracting grating of FIG. 19A without change. Further, small rectangles in the beams B11, B22, and B33 are formed by the region A23.

In FIG. 19B, reference numeral 192 denotes a main cell for receiving the main beam and 194 denotes sub cells for receiving sub beams. In FIG. 19B, diagonally hatched regions denote beams reflected from an adjacent recording layer. The fact that the sub cells and regions around the sub cells are indicated in white color means that the beams reflected from the adjacent recording layer are not incident on those regions, which is attributable to the region A23.

The sub cells for receiving the sub beams are set to have a width greater than that of existing cells in order to cope with variation in the position of the sub beams. Causes of the movement of the sub beams may include interlayer movement between recording/reproduction layers, compensation for spherical aberrations, variation in the focal distance of a lens, etc. Further, in order to prevent beams, reflected from the adjacent layer and flowing into the location adjacent to the main cell, from being incident on the sub cells, the main cell and the sub cells are arranged such that the distance (D) therebetween is great.

FIGS. 20A and 20B illustrate examples of a light receiving element according to the embodiment of FIG. 19. The light receiving element of the present invention includes a main cell 192 for receiving a main beam and sub cells 194 for receiving sub beams. In this case, the arrangement direction and location of the light receiving element vary according to the grating direction and magnification of an optical system. The sub cells 194 are characterized in that they are disposed in locations on which light reflected from an adjacent layer is not incident.

FIG. 20B illustrates an embodiment of a photodetecting means to which both a 1 beam DPP method according to the embodiment of FIG. 19 and a conventional method, for example, a 3 beam DPP method, are applied together. The photodetecting means of FIG. 20B includes cells 196 for receiving sub beams generated by the conventional 3 beam DPP method, as well as a main cell 192 for receiving a main beam and two sub cells for receiving sub beams diffracted by the diffraction grating of FIG. 19A. The sub cells 194 are disposed at locations free from the influence of beams reflected from the adjacent layer.

Figure 21A:
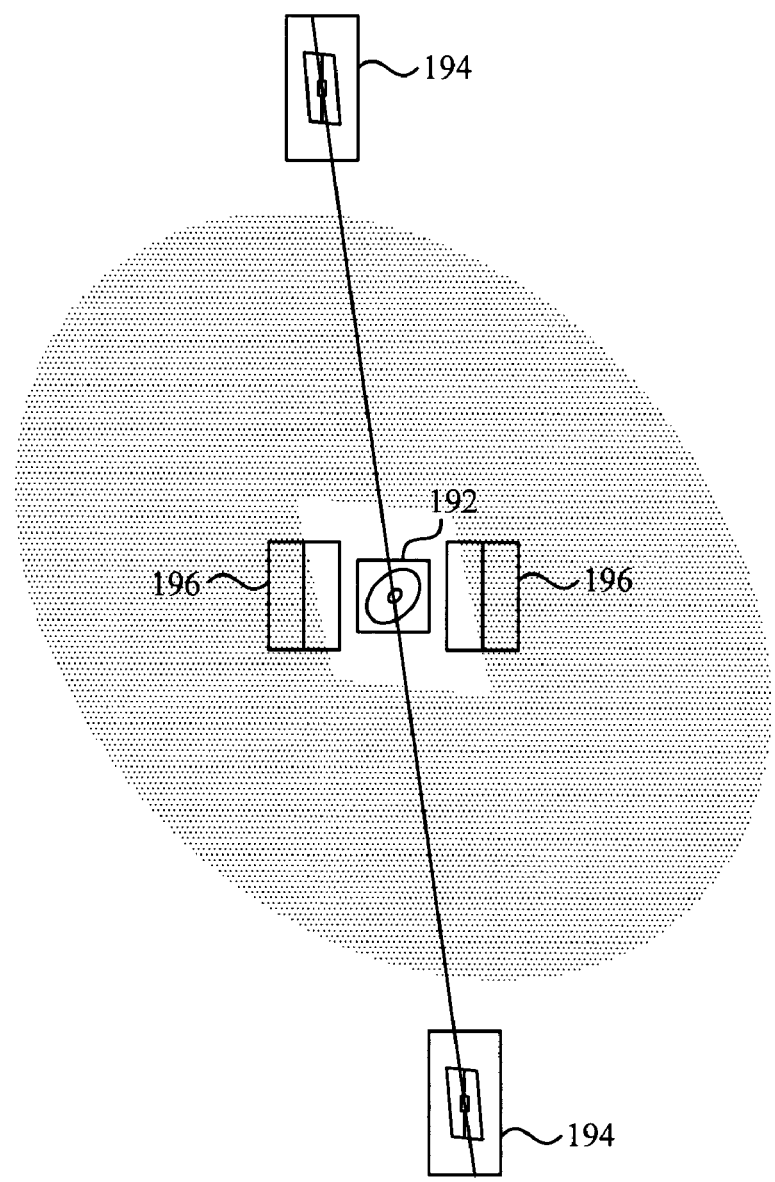
FIGS. 21A and 21B illustrate other examples of the arrangement of cells for sub beams according to the embodiment of FIG. 19.
Figure 21B:
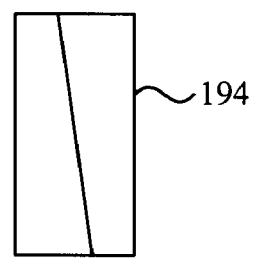

FIGS. 21A and 21B illustrate other examples of a photodetecting means according to the embodiment of FIG. 19, which shows the photodetecting means obtained by modifying the location and shape of the sub cells 194 in consideration of astigmatism. In the optical system using an astigmatism method, a main beam and sub beams are focused on a light receiving element at an incline according to the direction and focal distance of a cylindrical lens.

Therefore, as shown in FIGS. 21A and 21B, the sub cells 194 can be disposed at locations diagonally deviating from the main cell 192, and the boundary surfaces of the sub cells 194 for obtaining push-pull signals can have inclined shapes. The boundary surfaces can be divided by the angle defined by a line for connecting the main cell 192 and the sub cells 194. Even in this case, similar to FIG. 20B, the photodetecting means may further include sub cells 196 for generating sub beams based on the conventional 3 beam DPP method.

Meanwhile, in the diffraction gratings of FIGS. 16A and 19A, a pattern region A13 (A23), which prevents beams reflected from an adjacent layer from being incident on the sub cells for sub beams required to generate a tracking error signal, is implemented as a single element on the same plane as the pattern regions A11 and A12 (A21 and A22), which are the pattern regions for generating sub beams based on the 1 beam DPP method.

However, the present invention is not limited to these embodiments, and can be implemented such that a diffraction grating element including the pattern region A13 (A23) and a diffraction grating element including the pattern regions A11 and A12 (A21 and A22) can be separately constructed, as in the case of an embodiment which will be described later.

Embodiments for solving noise caused by beams reflected from the adjacent layer, that is, the problem of interlayer interference, have been described with reference to FIGS. 16A and 16B to FIGS. 21A and 21B. The above embodiments are implemented to remove part of beams flowing into the photodetecting means using diffractive elements. However, the diffractive elements not only remove all or part of beams reflected from the adjacent layer, but also diffract part of beams flowing from the current layer, on which recording/reproduction is currently performed, thus removing part of beam spots focused on the photodetecting means or greatly decreasing the intensity of the beam spots.

The part of beam spots which is removed, or the intensity of which is decreased in this way, is called a dead zone. When the objective lens is shifted in a radial direction, a proportional constant k varies according to the section of radial shift due to this dead zone, and the performance of an RF signal and reproduction/recording is deteriorated. Embodiments for solving this problem are described below.

First, a method of reducing interlayer interference by combining a typical DPP method using 3 beams with a Diffractive Optical Element (DOE) for generating a diffraction effect is described.

Figure 22A:
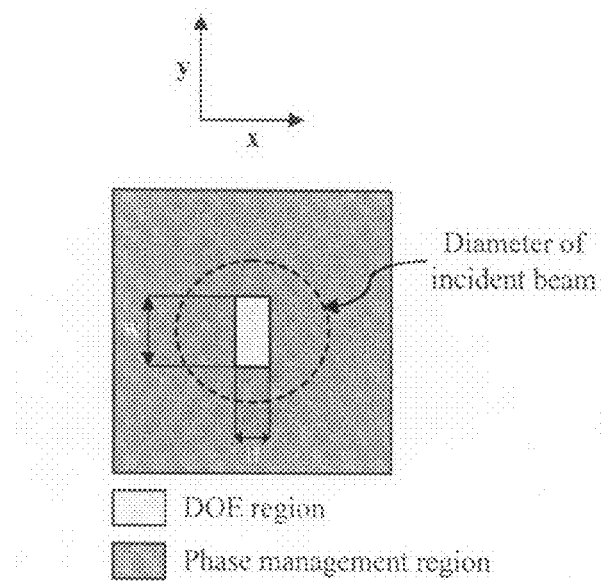
FIGS. 22A to 22C illustrate the shape and location of a DOE and the distribution of beams on a PD when a typical 3 beam DPP method is used.
Figure 22B:
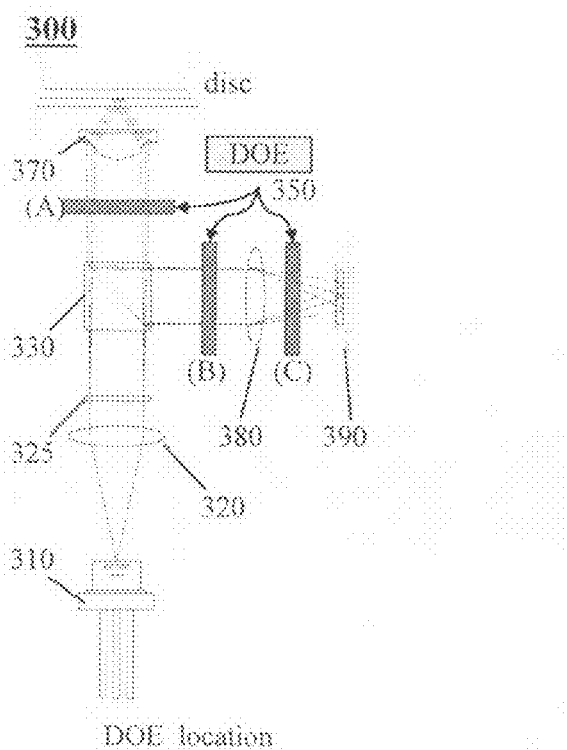
Figure 22C:
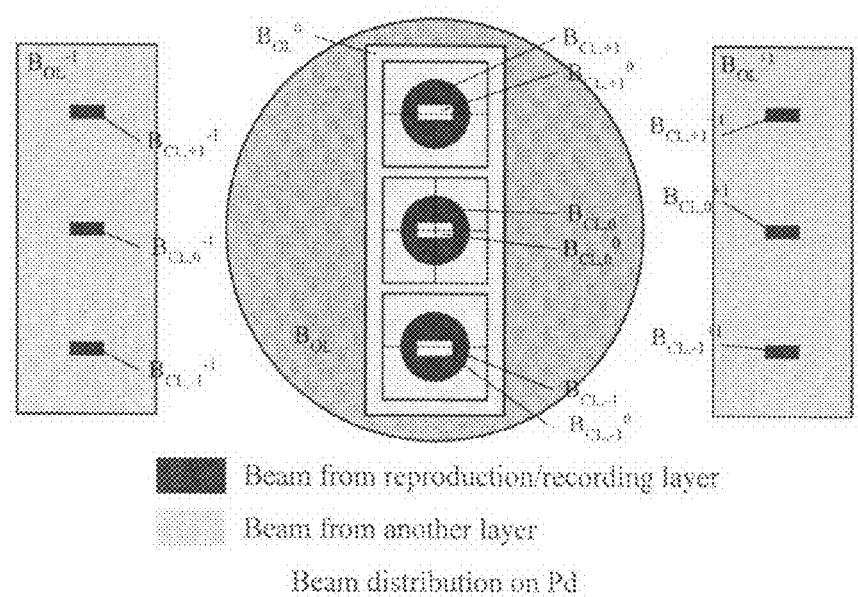

FIGS. 22A to 22C illustrate the shape and location of a DOE and the distribution of beams on a PD when a 3 beam DPP method is used.

An optical pickup device 300 using the 3 beam DPP method, as shown in FIG. 22B, includes a light source 310, a collimator lens 320, a grating 325, a beam splitter 330, a DOE 350, an objective lens 370, a sensor lens 380, and a photodetecting means 390. In an optical system using the 3 beam DPP method, the grating 325 for generating sub beams for DPP is disposed on the optical path between the light source 310 and the objective lens 370. Generally, the grating 325 for 3 beams is interposed between the collimator lens 320 and the beam splitter 330.

In an optical system using the 3 beam DPP method, as shown in FIG. 22B, when the DOE 350 having the pattern of FIG. 22A is inserted into the optical path of reflected beams extending from a disc to the PD 390, that is, the optical path in which the beams are focused on the PD 390 through the objective lens 370, the beam splitter 330, and the sensor lens 380, part of a 0th order beam flowing from an adjacent layer is separated and directed toward other locations on the PD 390 due to the pattern of the DOE, as shown in FIG. 22C.

In FIG. 22A, the DOE pattern of the DOE 350 has a grating formed in a vertical (perpendicular) direction, and thus part of the beam passing through the DOE 350 is diffracted (+/−1st order diffracted beams) by the DOE pattern, and the diffracted beams are disposed to the left and right of the 0th order beam passing through the DOE pattern without change, as shown in FIG. 22C. In this case, the 0th order beam and +/−1st order diffracted beams indicate whether diffraction occurs on the basis of the DOE pattern.

Since beams reflected from the current layer, on which recording or reproducing is being performed, are focused on the PD 390, the sizes of the beams correspond to the cell sizes of the PD 390, and the intensity of the beams is strong (these beams are indicated in dark color in FIG. 22C).

The main beam and two sub beams reflected from the current layer (separated by the grating 325) ($B_{CL,0}$, $B_{CL,+1}$, and $B_{CL,-1}$) are focused on the main cell for MPP and sub cells for SPP on the PD 390. Part of the beams is diffracted by the DOE pattern and is focused to the left and right of the main cell and the sub cells ($B_{CL,0}^{+/-1}$, $B_{CL,+1}^{+/-1}$, $B_{CL,-1}^{+/-1}$), and thus the above-described dead zones ($B_{CL,0}^{0}$, $B_{CL,+1}^{0}$, $B_{CL,-1}^{0}$) are formed in the main cell and the sub cells.

Since beams reflected from an adjacent layer other than the current layer are focused in front of or behind the PD 390, the beams focused on the PD 390 are large and the intensities thereof are weak (these beams are indicated in light color in FIG. 22C).

The beams reflected from the adjacent layer pass through the DOE 350 and form a large circle $B_{OL}$ in the center in FIG. 22C, and left and right rectangles $B_{OL}^{+1}$ and $B_{OL}^{-1}$. The beams passing through the DOE pattern form a vertically long rectangle $B_{OL}^{0}$ in the center large circle $B_{OL}$, and form rectangles $B_{OL}^{+1}$ and $B_{OL}^{-1}$, having the same shape as the vertically long rectangle $B_{OL}^{0}$, in locations to the left and right of the large circle.

The rectangle $B_{OL}^{0}$ formed by the DOE pattern region of FIG. 22A corresponds to the shape of the cell of the PD 390, and thus does not interfere with the beams reflected from the current layer and focused on the PD 390. That is, noise, caused by noise light reflected from the adjacent layer, can be reduced in the MPP signal and SPP signals.

In consideration of this fact, that is, the shapes and locations of the main cell and sub cells of a PD (with respect to beams formed by the adjacent layer) and/or the size and intensity of dead zones generated in the main cell and sub cells (with respect to the beams formed by the current layer), the DOE pattern and the shape of the DOE pattern region are designed.

As shown in FIG. 23, the DOE 350 can be implemented in various shapes, and has little difference in its performance of removing noise. In particular, it is important to design the DOE such that beams reflected from an adjacent layer do not flow into the sub cells for generating SPP signals. The regions other than the DOE pattern need only be implemented such that the thickness of the regions or the direction and shape of a grating are suitably adjusted to prevent a phase difference from being generated between the regions and the DOE pattern region.

Further, the pattern direction of the DOE (grating direction) preferably maintains an angle of 90 degrees with respect to the grating 325 for 3 beam separation, although there is no need to necessarily arrange the DOE pattern at a right angle with respect to the grating 325. In the embodiment of FIGS. 22A and 22B, since the grating 325 has a grating formed in a horizontal direction, the sub beams $B_{CL,+1}$ and $B_{CL,-1}$ are formed above and below the main beam $B_{CL,0}$, as shown in FIG. 22C. Further, the pitch of the grating of the DOE pattern is preferably designed such that beams separated by the DOE pattern and focused on the PD are disposed far away from each other, without overlapping each other.

As shown in FIG. 22B, the DOE can be disposed at locations (A) to (C). When a DOE is disposed on the path through which a beam incident on a disc passes, and the path through which the beam reflected from the disc passes, as in the case of the location (A), the DOE must be manufactured as a polarization dependent-element, such as a liquid crystal. Further, when the DOE is disposed at location (A), it is preferable to mount the DOE in an actuator so as to move the DOE along with an objective lens because the region of the DOE can be reduced.

When a DOE is disposed at location (B), the DOE region must be designed to be greater than that of (A) such that noise from the adjacent layer does not flow into the PDs when the objective lens is radially shifted. A DOE can also be disposed at location (C), but location (C) is less profitable than location (B) if an assembly tolerance or the like is taken into consideration although the area of DOE relative to the diameter of an incident beam is identical to that of location (B).

Generally, a DOE pattern, in which diffraction efficiency for a 0th order beam ranges from 0 to 60%, is used. In this case, the diffraction efficiency for the 0th order beam corresponding to 60% means that 60% of the beam incident on the DOE pattern passes therethrough without change, and the remaining 40% thereof is diffracted by the DOE pattern.

In FIG. 22A, as the diffraction efficiency of the DOE pattern approaches 0%, the quantity of light, focused on the region $B_{OL}{}^0$ of FIG. 22C as a 0th order beam, decreases, and thus fewer beams reflected from the adjacent layer are incident on the main cell and sub cells of the PD, which means that less noise is generated in the MPP signal and SPP signals.

However, the DOE pattern not only removes or reduces noise of the MPP signal and SPP signals, but also removes part of beams ($B_{CL,0}{}^0$, $B_{CL,+1}{}^0$, $B_{CL,-1}{}^0$) used for reproduced signals. As a 0th order diffracted beam flowing into the dead zone decreases, that is, as the diffraction efficiency of the DOE pattern approaches 0%, reproduced signals, such as an RF signal or servo signals, are deteriorated.

Further, such a dead zone is disadvantageous in that it varies a value k for each section of radial shift according to the amount of radial shift when an objective lens is shifted in a radial direction. Such variation in value k causes an offset in a DPP signal, thus deteriorating the performance of a tracking servo.

As shown in FIG. 22C, of the beams incident on and diffracted from a DOE pattern each having a vertically long rectangular shape of FIG. 22A, each beam reflected from the current layer and formed on the surface of the PD ($B_{CL,0}{}^0$, $B_{CL,+1}{}^0$, $B_{CL,-1}{}^0$, $B_{CL,0}{}^{+/-1}$, $B_{CL,+1}{}^{+/-1}$, $B_{CL,-1}{}^{+/-1}$) has a shape (a horizontally long rectangular shape) different from the shape (vertically long rectangular shape) of each beam reflected from the adjacent layer and formed on the surface of the PD ($B_{OL}{}^0$, $B_{OL}{}^{+1}$, $B_{OL}{}^{-1}$). This is attributable to the sensor lens for generating an astigmatism using the above-described cylindrical lens.

Therefore, when the beams reflected from the current layer pass through the sensor lens for generating an astigmatism after being diffracted by the DOE pattern region, having the vertically long rectangular shape of FIG. 22A, the beams are converted into beams having horizontally long rectangular shapes, such as $B_{CL,0}{}^0$, $B_{CL,+1}{}^0$, $B_{CL,-1}{}^0$, $B_{CL,0}{}^{+/-1}$, $B_{CL,+1}{}^{+/-1}$, and $B_{CL,-1}{}^{+/-1}$ of FIG. 22C, and are then focused on the surface of the PD.

In contrast, the beams reflected from the adjacent layer are focused on the surface of the PD while maintaining vertically long rectangular shapes, such as $B_{OL}{}^0$, $B_{OL}{}^{+1}$ and $B_{OL}{}^{-1}$ of FIG. 22C, even if the beams pass through the sensor lens for generating an astigmatism after being diffracted by the DOE pattern region having the vertically long rectangular shape of FIG. 22A.

Next, a method of reducing interlayer interference by combining a 1 beam DPP method with a DOE is described below.

Figure 24A:
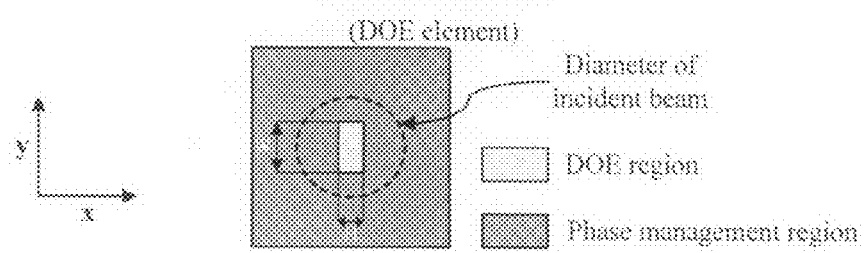
FIGS. 24A to 24C illustrate the shape and location of a DOE and the distribution of beams on a PD when a 1 beam DPP method is used.
Figure 24B:
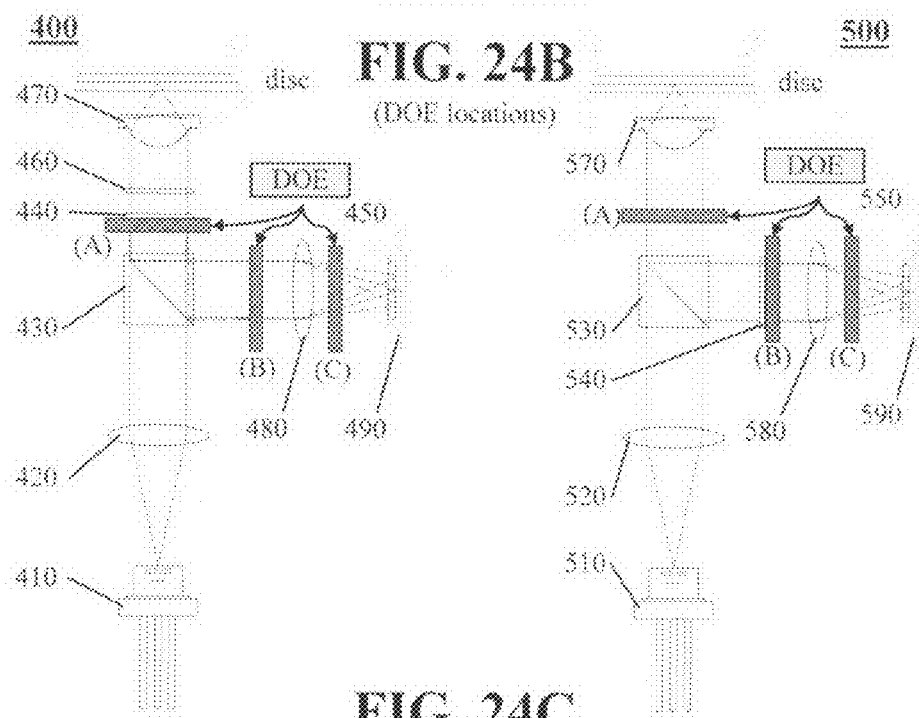
Figure 24C:
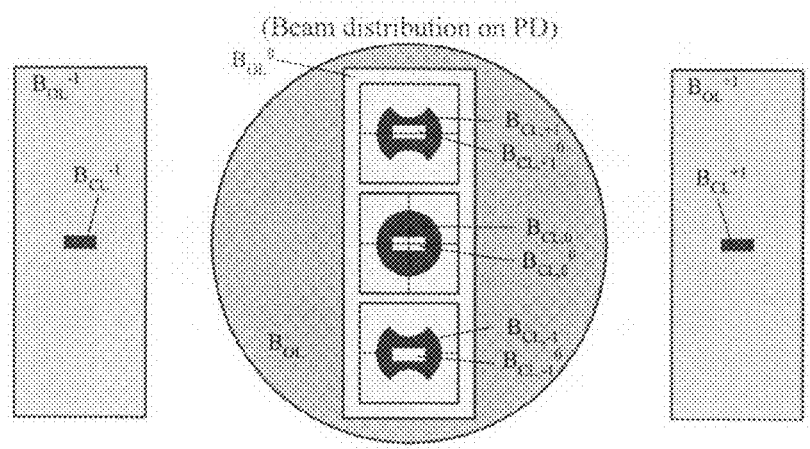

FIGS. 24A to 24C illustrate the shape and location of a DOE and the distribution of beams on a PD when a 1 beam DPP method is used.

In FIG. 24B, an optical pickup device 400 or 500 using a 1 beam DPP method includes a light source 410 or 510, a collimator lens 420 or 520, a beam splitter 430 or 530, a grating 440 or 540, a DOE 450 or 550, an objective lens 470 or 570, a sensor lens 480 or 580, and a photodetecting means 490 or 590. A quarter wave plate 460 may be included in the optical pickup device 400 or 500 depending on the location of the grating 440 or 540.

The grating 440 or 540 is entirely different from the grating 325 of FIG. 22B. The grating 325 of FIG. 22B has a grating shape for generating 3 beams, whereas the grating 440 or 540 of FIG. 24B has a grating shape that diffracts only a beam corresponding to a DC component (offset), but not beams corresponding to an AC component, among beams reflected from and separated by the land/groove structure of the track of a disc, as shown in FIG. 7C or FIGS. 13A to 13C.

The sub beams $B_{CL,+1}$ and $B_{CL,-1}$ of FIG. 24C have shapes obtained when the grating 440 or 540 having the pattern of FIG. 7C or FIG. 13A is used. When the pattern of FIG. 13A is used for the grating 440 or 540, the region A1, which is the first pattern, has a grating formed in a horizontal direction, and thus the sub beams $B_{CL,+1}$ and $B_{CL,-1}$, which are +/-1st order beams diffracted by the region A1, are arranged above and below the main beam $B_{CL,0}$, which is a 0th order beam passing through the grating 440 or 540 without change, as shown in FIG. 24C.

As shown in FIG. 22B, the DOE 450 or 550 can be disposed at locations (A) to (C), and the characteristics of the DOE at respective locations are identical to those of the case where the 3 beam DPP method is used, as described above. Further, the grating 440 or 540 and the DOE 450 or 550 can be integrated into a single structure. When the DOE or the grating for the 1 beam DPP method is disposed on a path through which a beam incident on a disc passes and a path through which a beam reflected from the disc passes, as in the case of location (A), it is preferable to manufacture the DOE or the grating as a polarization element in order to diffract only the beam reflected from the disc, without diffracting the beam incident on the disc, from the standpoint of optical efficiency. Accordingly, the DOE or the grating must be manufactured as a polarization-dependent element, such as a liquid crystal.

Similar to the above case, there is no need to arrange the grating direction of the DOE pattern in the DOE 450 or 550 to form a right angle with respect to the grating direction of the grating 440 or 540 for the 1 beam DPP method. That is, the DOE pattern need only be formed such that the beams diffracted by the DOE 450 or 550 are not focused on the main cell and sub cells of the PDIC. For example, even if the DOE pattern in the DOE 450 or 550 and the grating 440 or 540 for the 1 beam DPP method have the same grating direction, the angle of diffraction of the DOE pattern is set to increase, thus preventing the beams diffracted by the DOE pattern from being focused on the main cell and sub cells of the PDIC.

However, it is more preferable to arrange the grating directions of the DOE pattern and the grating 440 or 540 for the 1 beam DPP method to form a right angle therebetween. In the embodiment of FIGS. 24A to 24C, since the grating 440 or 540 has a grating formed in a horizontal direction (radial direction), sub beams $B_{CL,+1}$ and $B_{CL,-1}$ are formed above and below the main beam $B_{CL,0}$, as shown in FIG. 24C. Further, the grating pitches of the DOE pattern and the grating are preferably designed such that beams focused on the PD are disposed far away from each other and do not overlap each other.

Similar to the above description, the DOE pattern and the shape thereof are designed in consideration of the shapes and locations of the main cell and sub cells of the PD and/or the sizes and intensities of dead zones generated in the main cell and sub cells.

That is, the region of the DOE pattern in the DOE 450 or 550 has an outer shape designed to correspond to a region in which the beams capable of influencing the main cell and sub cells of the PD, among beams reflected from the adjacent layer, pass through the DOE 450 or 550. In particular, it is important to design the region of the DOE pattern such that the sub cells of the PD are minimally influenced by the beams reflected from the adjacent layer. Therefore, the DOE 450 or 550 may be implemented in various shapes, as shown in FIGS. 23A to 23C.

When the region of the DOE pattern is designed to be identical to that of the 3 beam DPP method of FIG. 22A, the degradation of a tracking servo and reproduced/recorded signals caused by the dead zones $B_{CL,0}{}^0$, $B_{CL,+1}{}^0$, and $B_{CL,-1}{}^0$ also occurs.

Figure 25:
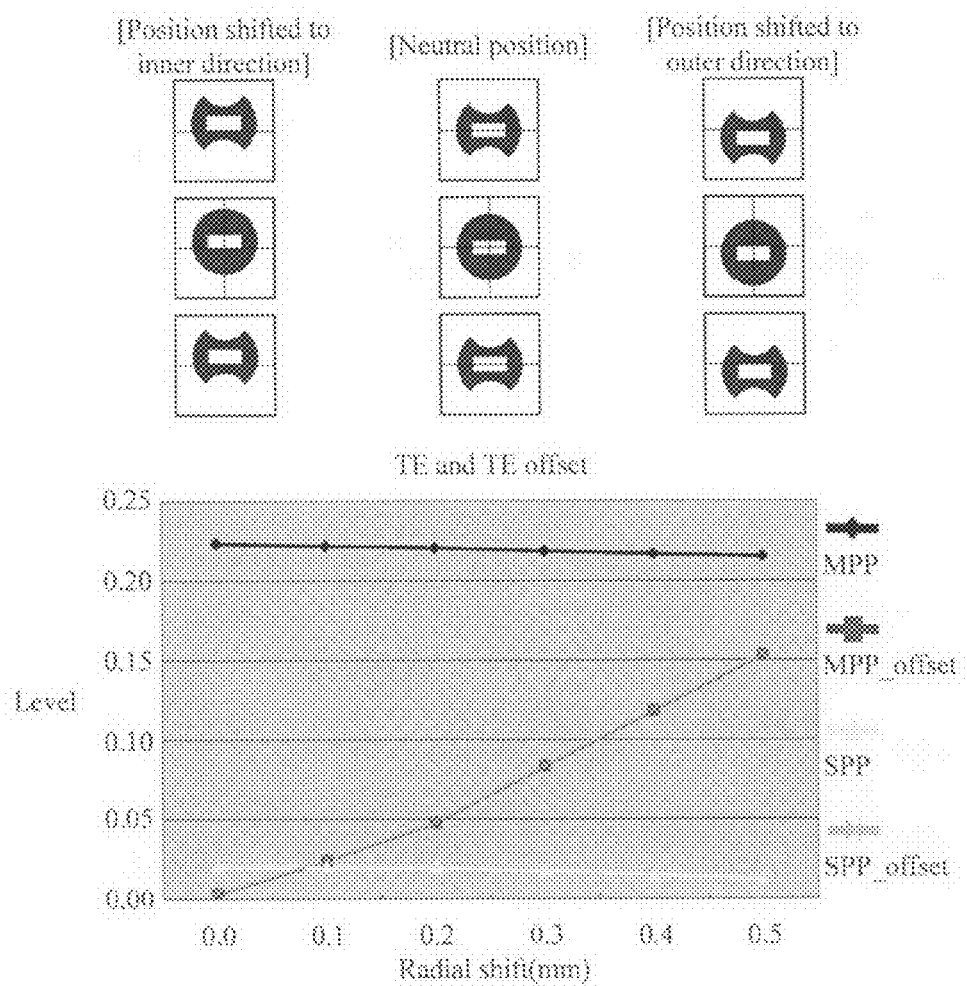
FIG. 25 illustrates variation in the offset of a tracking error signal according to the radial shift of an objective lens when sub beams are disposed at the centers of sub cells in the state in which the objective lens is not shifted in a radial direction in a 1 beam DPP method.

Variation in a value k caused by dead zones is described below. When sub beams are accurately focused on the centers of sub cells while an objective lens is not shifted in a radial direction, it can be seen through FIG. 25 that the values k (slope in graphs) obtained in a region including dead zones and in a region not including the dead zones are different from each other when the objective lens is shifted in a radial direction from the center of the optical pickup device to the inner or outer circumference of the disc. An MPP offset and an SPP offset are changed, but they do not cause a major problem because the MPP offset and SPP offset are changed in the same direction.

Figure 26:
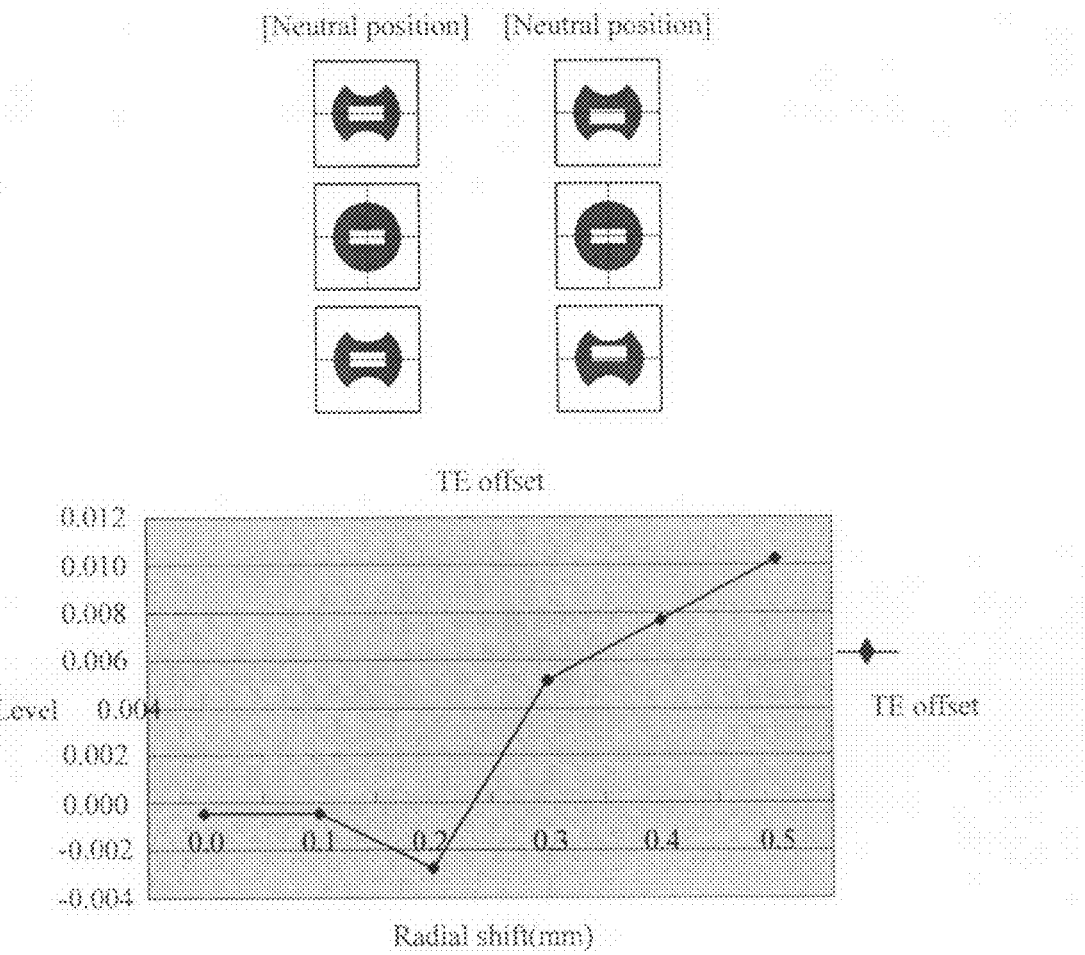
FIG. 26 illustrates variation in the offset of a tracking error signal according to the radial shift of an objective lens when sub beams are not disposed at the centers of sub cells in the state in which the objective lens is not shifted in a radial direction in a 1 beam DPP method.

However, as shown in FIG. 26, there may frequently occur the case where sub beams are disposed to slightly deviate from the center of the sub cells due to interlayer movement, error in the pitch of diffractive elements, variation in the magnification of an optical system, etc. even when the objective lens is not shifted in a radial direction. Even if no other errors exist, the positions of sub beams are inevitably varied when the layer L0 is reproduced or recorded and when the layer L1 is reproduced or recorded through interlayer movement.

In this case, as shown in FIG. 26, the MPP offset and SPP offset are changed in opposite directions (the signs thereof are opposite) even through the offsets are partially generated and the amount of the offsets is not large, so that there is a problem in that the offset of the MPP signal, generated when the objective lens is shifted in a radial direction, cannot be cancelled using the offsets of the SPP signals.

Meanwhile, unlike the distribution of beams in FIG. 16B or 19B, the distribution of beams in FIG. 24C shows that, since the main cell and the sub cells are adjacent to each other, the beam ($B_{OL}{}^0$ in $B_{OL}$) from the adjacent layer, which passes through the grating 440 or 540 and the DOE 450 or 550, is also focused on the sub cells, thus influencing a tracking error signal generated from the sub cells.

As shown in the embodiments of FIGS. 16, 17, and 19 to 21, when the main cell and the sub cells are arranged far away from each other, there is an advantage in that the sub cells are hardly influenced by beams from the adjacent layer, whereas there may be several problems in that the size of an optical pickup device increases due to the increase in the size of a photodetecting means, etc., and the optical efficiency of the grating is deteriorated because the angle of diffraction of the sub beams diffracted from the grating for 1 beam DPP must be large.

In the case of FIG. 24C, since part of the beam from the adjacent layer, passing through the grating 440 or 540 without change, is diffracted to the regions $B_{OL}{}^{+1}$ and $B_{OL}{}^{-1}$ while passing through the pattern region of the DOE 450 or 550, the intensity of the beam focused on the region $B_{OL}{}^0$ is less than that of the region $B_{OL}$.

Since it may be preferable to arrange the main cell and the sub cells to be adjacent to each other in consideration of the slight degradation in quality of the sub beams, the condition in which the size of an optical pickup device increases, and the decrease in the optical efficiency of the grating, the embodiments, which will be described later, address this case.

In the case of a 1 beam DPP method, it is possible to change the locations of sub cells, that is, the locations on which sub beams are focused. FIG. 27A is related to the embodiment of FIGS. 24A to 24C, and shows the case where the grating direction of the pattern for generating sub beams in the grating 440 or 540 for 1 beam DPP is formed in a horizontal direction, as shown in FIG. 27A. Accordingly, sub beams $B_{CL,+1}$ and $B_{CL,-1}$ are arranged above and below the main beam $B_{CL,0}$.

Since the DOE pattern region of the DOE 450 or 550 for removing interlayer interference in FIG. 27A has a grating formed in a vertical direction, the beams, reflected from the adjacent layer and diffracted by the DOE pattern, are formed to the left and right of the PDIC, although this is not shown in FIG. 27A.

In contrast, in FIG. 27B, the grating direction of the pattern for generating sub beams in the grating 440 or 540 for 1 beam DPP and the grating direction of the DOE pattern region in the DOE 450 or 550 are respectively designed to have a difference corresponding to an angle of 90 degrees with respect to the case of FIG. 27A, so that the locations of the sub cells of the PDIC must be rotated by an angle of 90 degrees.

Each sub cell must be divided into at least two parts in a direction corresponding to a radial direction. At this time, the direction corresponding to the radial direction is determined regardless of the grating direction of the pattern for generating sub beams in the grating for 1 beam DPP. In FIGS. 27A and 27B, a horizontal direction indicates the radial direction, and the shape of the beam reflected from the current layer is rotated by an angle of 90 degrees due to a sensor lens, so that the radial direction in the sub cells of the PDIC is a vertical direction. Therefore, as shown in FIGS. 27A and 27B, each sub cell must be divided into two parts, that is, upper and lower parts, on the basis of a vertical direction.

In the case of FIG. 27B, dead zones are arranged in a horizontal direction. Further, when an objective lens is shifted in the radial direction, the main beam and the sub beams are moved in the radial direction. As described above, the radial direction in the PDIC in FIG. 27B is the vertical direction. Accordingly, no variation in a value k caused by the radial shift of the objective lens occurs.

Figure 28A:
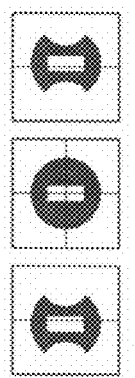
FIGS. 28A and 29B illustrate the movement direction of sub beams in sub cells in respective embodiments, in which the positions of the sub beams are changed in a PDIC through a combination of a grating for a 1 beam DPP method and a DOE for removing interlayer interference.
Figure 28B:

Further, as described above, even when an objective lens is placed at the center, there may frequently occur the case where sub beams are arranged to slightly deviate from the centers of sub cells due to interlayer movement, error in the pitch of a diffractive element, variation in the magnification of an optical system, etc. In the case of the embodiment of FIG. 27B, sub beams are moved in a direction identical to the lines for dividing the sub cells, as shown in FIG. 28B. Therefore, signals are not influenced by the movement of the sub beams caused by several factors.

Figure 29A:
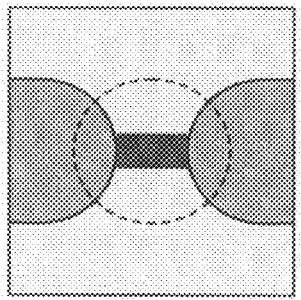
Figure 29B:
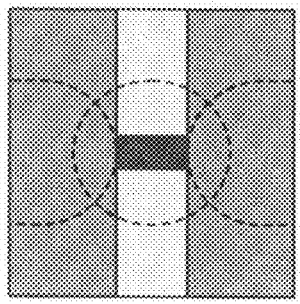
Figure 29C:
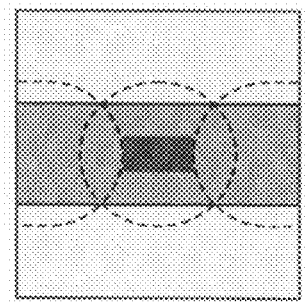

FIGS. 29A to 29C illustrate examples in which various shapes of a DOE for removing interlayer interference and a diffraction grating for a 1 beam DPP method are implemented in a single plane. When the transmissivity of a 0th order beam is as high as 50 to 60%, a typical grating, other than an HOE, can be used. Further, as shown in FIGS. 29A to 29C, each grating pattern can be formed in a single plane. As shown in FIGS. 29A to 29C, it is possible to combine the shapes of DOE patterns with respective diffraction gratings.

As shown in FIGS. 30A and 30B, a beam incident on a diffraction grating is separated into a 0th order beam, passing through the diffraction grating without change, and +/−1st order beams diffracted by the diffraction grating. The angle of diffraction and the light quantities of the 0th order beam and +/−1st order beams can be adjusted by combining the pitch of depression/protrusion, the depth of depression, the duty ratio of protrusion/depression, the inclinations of protrusion and depression, etc.

In order to cause the transmissivity of the 0th order beam of the DOE to be approximate to 0, most of the light passing through the DOE pattern must be diffracted. This structure can be implemented through a blazed type HOE, as shown in FIG. 30C. When the DOE is implemented by finely dividing the surface of the DOE into a plurality of steps, the DOE is approximate to the blazed type HOE and the transmissivity of the 0th order beam is approximate to 0, as the divided steps are more finely formed.

When the DOE is arranged to move along with the objective lens, it must react only to the polarization of light reflected from the disc, and thus a liquid crystal is for this operation. The liquid crystal is arranged such that a refractive index differs only in a specific polarization component, thus causing a phase difference in the same method as that of a typical diffraction grating or HOE.

Figure 31:
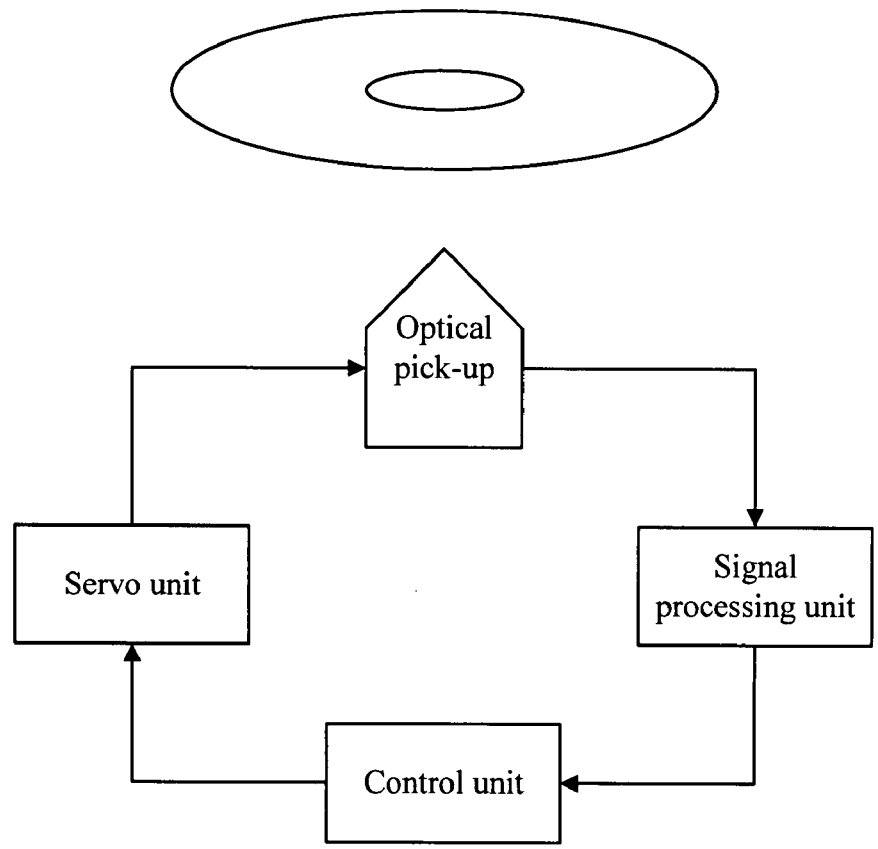
FIG. 31 illustrates the brief construction of a data recording/reproduction apparatus using the optical pickup device according to the present invention.

FIG. 31 illustrates the brief construction of a data recording/reproduction apparatus using the optical pickup device according to the present invention. The data recording/reproducing apparatus according to the present invention includes an optical pickup device for allowing a beam to be incident on a recording medium and receiving a beam reflected from the recording medium, a signal processing unit for receiving a signal from the optical pickup device and demodulating the received signal, a control unit for generating servo signals, such as a focusing error signal and a tracking error signal, using a signal from the signal processing unit, and a servo unit for performing a control operation to allow a laser beam to follow the track using the servo signals.

The optical pickup device 100, 200, 400 or 500 of the present invention can be applied to part of an optical pickup device capable of recording and/or reproducing all of a CD, a DVD and a BD.

For example, when an optical system for a CD and a DVD and an optical system for a BD are implemented in a single pickup device, two objective lenses must be mounted on a single actuator, and the objective lens of the optical system for the BD is generally arranged off-axis, as shown in FIG. 3.

Therefore, the optical pickup device 100, 200, 400 or 500 of the present invention is applied to the optical system for the BD, so that problem of the 3 beam DPP method, which may occur due to the off-axis arrangement of the objective lens, can be solved.

Further, the optical pickup device 100, 200, 400 or 500 of the present invention can remove noise occurring in reproduced/recorded signals due to interlayer interference, so that it is suitable for recording/reproduction of optical storage media having a plurality of recording layers, for example, DVD-RAM, DVD-RW, DVD+RW, DVD-R, DVD+R, BD-R, BD-RE, etc.

As described above, the optical pickup device of the present invention is advantageous in that it can remove the offset of a push-pull signal occurring due to the off-axis arrangement of an objective lens, can effectively remove interlayer noise occurring in a multi-layer disc, and can eliminate the influence of dead zones generated when the interlayer noise is removed, so that the offset of a push-pull signal caused by the radial shift of the objective lens and the influence of movement of sub beams can be effectively removed, thus obtaining a stable tracking error signal and improving reproduction and recording performance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical pickup device, comprising:
   a light source for emitting a beam having a predetermined wavelength;
   an objective lens for focusing the beam emitted from the light source on an optical storage medium;
   a beam splitter for passing or reflecting the beam emitted from the light source or beams reflected from the optical storage medium;
   a first diffractive element for generating a second beam having no component corresponding to a position of a beam, focused on the optical storage medium, on a track of the optical storage medium, from the beams reflected from the optical storage medium;
   a second diffractive element;
   a sensor lens for generating an astigmatism in the beams reflected from the optical storage medium; and
   photodetecting means including main detection means for receiving a first beam passing through the first and second diffractive elements without change, and two first sub detection means for receiving the second beam,
   wherein the second diffractive element diffracts part of beams reflected from other layers, rather than a current layer of the optical storage medium on which recording or reproduction is currently performed, thus preventing the diffracted beams from being incident on the photodetecting means.

2. The optical pickup device according to claim 1, wherein the first diffractive element comprises a first region for diffracting part of an incident beam and generating the second beam, and the first region does not include a region in which a beam diffracted by the optical storage medium and a beam not diffracted by the optical storage medium, among the beams reflected from the optical storage medium while being diffracted and separated by the optical storage medium, overlap each other when passing through the first diffractive element.

3. The optical pickup device according to claim 2, wherein the first region is formed in a rectangular shape which has a region, in which the beam diffracted by the optical storage medium among the beams reflected from the optical storage medium passes through the first diffractive element, as a boundary.

4. The optical pickup device according to claim 2, wherein the first region comprises a region placed above a line for connecting two upper points and a region placed below a line for connecting two lower points, of four points at which the beam diffracted by the optical storage medium and the beam not diffracted by the optical storage medium, among the beams reflected from the optical storage medium, intersect when passing through the first diffractive element.

5. The optical pickup device according to claim 2, wherein the first diffractive element comprises a second region in which a grating pattern is formed in a region other than the first region, and which diffracts part of the beams passing through the grating pattern and prevents the diffracted beams from being focused on the photodetecting means.

6. The optical pickup device according to claim 5, wherein the first region and the second region have grating directions forming a right angle.

7. The optical pickup device according to claim 2, wherein the first region includes a grating formed such that part of the incident beam is diffracted in a direction perpendicular to a direction in which the beams are diffracted by the optical storage medium.

8. The optical pickup device according to claim 2, wherein the first region includes a grating formed such that part of the incident beam is diffracted in a direction in which the beams are diffracted by the optical storage medium.

9. The optical pickup device according to claim 2, wherein the second diffractive element comprises a third region for diffracting part of an incident beam, and the third region corresponds to a region in which a beam to be focused on the photodetecting means, among the beams reflected from said other layers, passes through the second diffractive element.

10. The optical pickup device according to claim 9, wherein the first region includes a grating formed such that part of the incident beam is diffracted in a direction parallel or perpendicular to a direction in which the beams are diffracted by the optical storage medium.

11. The optical pickup device according to claim 10, wherein the first region and the third region have grating directions forming a right angle.

12. The optical pickup device according to claim 9, wherein the third region corresponds to a region in which beams to be focused on the first sub detection means, among the beams reflected from said other layers, pass through the second diffractive element.

13. The optical pickup device according to claim 2, wherein each of the first sub detection means is disposed out of an effective radius of the beam passing through the first diffractive element and the second diffractive element without change, among the beams reflected from said other layers.

14. The optical pickup device according to claim 13, wherein the second diffractive element comprises a third region for diffracting part of the incident beam, and the third region corresponds to a region in which beams to be focused on the first sub detection means, among the beams reflected from said other layers, pass through the second diffractive element.

15. The optical pickup device according to claim 14, wherein the first region includes a grating formed such that part of the incident beam is diffracted in a direction parallel or perpendicular to a direction in which the beams are diffracted by the optical storage medium, and wherein the first region and the third region have grating directions forming a right angle.

16. The optical pickup device according to claim 13, wherein each of the first sub detection means has a width greater than that of the main detection means.

17. The optical pickup device according to claim 13, wherein each of the first sub detection means is disposed at a location deviating from the main detection means according to a focal direction and a focal distance of the sensor lens.

18. The optical pickup device according to claim 17, wherein each of the first sub detection means is divided by a boundary surface formed at an angle, which is defined by a line for connecting the first sub detection means and the main detection means, so as to obtain push-pull signals.

19. The optical pickup device according to claim 13, further comprising a grating for diffracting the beam emitted from the light source into a 0th order beam and +/−1st order beams and focusing the diffracted beams on the optical storage medium, and wherein the photodetecting means further comprises two second sub detection means for receiving the +/−1st order beams reflected from the optical storage medium.

20. The optical pickup device according to claim 19, wherein the first sub detection means and the main detection means have a distance therebetween that is five times or more a distance between the second sub detection means and the main detection means.

21. The optical pickup device according to claim 2, wherein the first diffractive element and the second diffractive element are integrated into a single device.

22. The optical pickup device according to claim 2, wherein the first diffractive element is interposed between the beam splitter and the objective lens, between the beam splitter and the sensor lens, or between the sensor lens and the photodetecting means.

23. The optical pickup device according to claim 22, further comprising a quarter wave plate for rotating polarization of beams between the first diffractive element and the objective lens when the first diffractive element is interposed between the beam splitter and the objective lens.

24. The optical pickup device according to claim 23, wherein the first diffractive element diffracts only the beams reflected from the optical storage medium and does not diffract the beam emitted from the light source.

25. The optical pickup device according to claim 2, wherein the second diffractive element is interposed between the beam splitter and the objective lens, between the beam splitter and the sensor lens, or between the sensor lens and the photodetecting means.

26. The optical pickup device according to claim 25, wherein the second diffractive element diffracts only the beams reflected from the optical storage medium and does not diffract the beam emitted from the light source when the second diffractive element is interposed between the beam splitter and the objective lens.

27. The optical pickup device according to claim 1, wherein both the first diffractive element and the second diffractive element are manufactured using liquid crystals.

28. The optical pickup device according to claim 2, wherein:
the main detection means is divided into at least two parts in directions corresponding to a radial direction and a tangential direction respectively, and each of the first sub detection means is divided into at least two parts in a direction corresponding to the radial directions, and
a tracking error signal is detected by Mpp−k(Spp1+Spp2) when it is assumed that a push-pull signal detected by the main detection means, is Mpp and two push-pull signals detected by the first sub detection means are Spp1 and Spp2, where k is calculated based on variation in an offset of the Mpp and variation in offsets of Spp1 and Spp2 caused by a radial shift of the objective lens.

29. The optical pickup device according to claim 1, wherein the optical storage medium is at least one of a Compact Disc (CD)-recordable(R), CD-rewritable (RW), Digital Versatile Disc (DVD)-Random Access Memory (RAM), a DVD-RW, a DVD+RW, a DVD-R, DVD+R, a Blu-ray Disc (BD)-Recordable (R), and a BD-Writable (RE).

30. The optical pickup device according to claim 1, wherein the light source emits a beam having a blue wavelength, and the objective lens deviates from a central axis of the optical storage medium.

* * * * *